US012784266B2

(12) United States Patent
Zhao et al.

(10) Patent No.: US 12,784,266 B2
(45) Date of Patent: Nov. 3, 2026

(54) INTERACTIVE BEHAVIOR UNDERSTANDING METHOD FOR POSTURE RECONSTRUCTION BASED ON FEATURES OF SKELETON AND IMAGE

(71) Applicant: CHINA UNIVERSITY OF MINING AND TECHNOLOGY, Xuzhou (CN)

(72) Inventors: Xiaohu Zhao, Xuzhou City (CN); Xingyi You, Xuzhou City (CN); Peng You, Xuzhou City (CN); Sheng Ye, Xuzhou City (CN); Yong Liu, Xuzhou City (CN)

( * ) Notice: Subject to any disclaimer, the term of this patent is extended or adjusted under 35 U.S.C. 154(b) by 224 days.

(21) Appl. No.: 18/755,735

(22) Filed: Jun. 27, 2024

(65) Prior Publication Data

US 2025/0022165 A1 Jan. 16, 2025

(30) Foreign Application Priority Data

Jul. 10, 2023 (CN) ......................... 202310838898.9

(51) Int. Cl.
*G06T 7/73* (2017.01)
*G06T 5/10* (2006.01)
(Continued)

(52) U.S. Cl.
CPC .................. *G06T 7/73* (2017.01); *G06T 5/10* (2013.01); *G06T 5/20* (2013.01); *G06V 10/44* (2022.01);
(Continued)

(58) Field of Classification Search
CPC .... G06T 7/73; G06T 5/10; G06T 5/20; G06T 2207/20044; G06T 2207/20084;
(Continued)

(56) References Cited

U.S. PATENT DOCUMENTS 11,688,139 B1 * 6/2023 Karagoz ............. G06N 3/0455
345/419
2018/0096229 A1 * 4/2018 Bronstein ............... G06F 17/14
(Continued)

OTHER PUBLICATIONS

Honghao Fu, Libo Sun, SDR-GAIN: A High Real-Time Occluded Pedestrian Pose Completion Method for Autonomous Driving, Jun. 6, 2023, (Year: 2023).*
(Continued)

*Primary Examiner* — Chineyere Wills-Burns
*Assistant Examiner* — Lucius Cameron Green Allen

(57) ABSTRACT

The present invention discloses an interactive behavior understanding method for posture reconstruction based on skeleton and image features. The steps are as follows: constructing and preprocessing the data set, extracting skeleton and image features, fusing and reconstructing these features, and conducting experimental evaluation and validation. This method retains the purity of skeleton features for human behavior information extraction and uses image features to retain effective environmental information, complementing the model feature information. Skeleton features are extracted using a graph convolution network, enhancing the relevance of input skeleton point information for accurate feature extraction. Effective image features are quickly and accurately extracted through the Vision Transformer network combined with a multi-head attention mechanism.

1 Claim, 21 Drawing Sheets

| | | |
|---|---|---|
| -114.79203541501329 | 72.486610699216730 | 20.834605286576560 |
| -152.14680443437078 | -18.81573082900786 | -404.03599491493856 |
| -110.49714802115818 | 20.298698631163916 | -836.61985905996240 |
| 114.793854312523540 | -72.47507585975472 | -20.874276461987847 |
| 64.682463941049040 | -58.81243643856169 | -466.11727996133320 |
| 210.196445754335170 | 229.49134070655600 | -753.48772599795210 |
| 19.260557135458384 | 22.275409915903765 | 243.235627295591480 |
| -13.351217597672075 | 4.8704331457302030 | 493.178565417005300 |
| -62.938759728379410 | -65.40464006681032 | 569.489852678648300 |
| -63.266604452492860 | -30.50264448178450 | 669.102499345017300 |
| 118.421381262931850 | -63.21694735949177 | 448.346050414310640 |
| 254.503400731134660 | -112.7206899250186 | 219.597677863515400 |
| 116.238341529256100 | -157.6034305864336 | 55.839790783660646 |
| -112.10819631316872 | 93.217334553335600 | 433.493607648976200 |
| -142.73179795100395 | 165.85939521027922 | 205.699611479904900 |
| -64.328207166581480 | 65.311149852738250 | 54.898345102142460 |

(51) Int. Cl.

| | |
|---|---|
| ***G06T 5/20*** | (2006.01) |
| ***G06V 10/44*** | (2022.01) |
| ***G06V 10/80*** | (2022.01) |
| ***G06V 10/82*** | (2022.01) |

(52) U.S. Cl.
CPC .. *G06V 10/806* (2022.01); *G06T 2207/20044* (2013.01); *G06T 2207/20084* (2013.01)

(58) Field of Classification Search
CPC ........... G06T 2207/20081; G06T 2207/30196; G06V 10/44; G06V 10/806; G06V 10/82; Y02T 10/40
USPC .......................................................... 382/103

See application file for complete search history.

(56) References Cited

U.S. PATENT DOCUMENTS

| | | | | |
|---|---|---|---|---|
| 2021/0386359 | A1* | 12/2021 | Adeli-Mosabbeb | A61B 5/1101 |
| 2022/0066544 | A1* | 3/2022 | Kwon | G06T 7/251 |
| 2022/0207265 | A1* | 6/2022 | Sun | G06T 7/246 |
| 2022/0222852 | A1* | 7/2022 | Hebbalaguppe | G06V 10/82 |
| 2022/0254101 | A1* | 8/2022 | Osuga | G06T 17/00 |
| 2024/0021019 | A1* | 1/2024 | Yu | G06T 7/277 |
| 2025/0060986 | A1* | 2/2025 | Lavin | G06F 8/41 |

OTHER PUBLICATIONS

Ze Liu et al., Swin Transformer: Hierarchical Vision Transformer using Shifted Windows, Aug. 17, 2021 (Year: 2021).*
Heng-Tze Cheng et al., Wide & Deep Learning for Recommender Systems, Jun. 24, 2016, Google Inc. (Year: 2016).*

* cited by examiner

| | | |
|---|---|---|
| −114. 79203541501329 | 72. 486610699216730 | 20. 834605286576560 0 |
| −152. 14680443437078 | −18. 81573082900786 | −404. 03599491493856 |
| −110. 49714802115818 | 20. 298698631163916 | −836. 61985905996240 |
| 114. 79385431252354 0 | −72. 47507585975472 | −20. 87427646198784 7 |
| 64. 682463941049040 0 | −58. 81243643856169 | −466. 11727996133320 |
| 210. 19644575433517 0 | 229. 4913407065560 0 | −753. 48772599795210 |
| 19. 260557135458384 0 | 22. 275409915903765 | 243. 23562729559148 0 |
| −13. 351217597672075 | 4. 870433145730203 0 | 493. 17856541700530 0 |
| −62. 938759728379410 | −65. 40464006681032 | 569. 48985267864830 0 |
| −63. 266604452492860 | −30. 50264448178450 | 669. 10249934501730 0 |
| 118. 42138126293185 0 | −63. 21694735949177 | 448. 34605041431064 0 |
| 254. 50340073113466 0 | −112. 7206899250186 | 219. 59767786351540 0 |
| 116. 23834152925610 0 | −157. 6034305864336 | 55. 839790783660646 0 |
| −112. 10819631316872 | 93. 217334553335600 | 433. 49360764897620 0 |
| −142. 73179795100395 | 165. 85939521027922 | 205. 69961147990490 0 |
| −64. 328207166581480 | 65. 311149852738250 | 54. 898345102142460 0 |

FIG. 1

```
55
1
72057594037937060 0 1 1 1 1 0 0.2505524 0.1880788 2
25
0.01614967 -0.3502199 3.59662 257.9908 244.1186 980.4426 669.9993 -0.3139995 0.0402661 0.9485633 -0.003252536 2
0.04242656 0.0020608 3.585501 260.6733 208.2854 988.5458 566.5757 -0.4021769 0.04039331 0.9146704 0.0005646602 2
0.06636174 0.3402841 3.559933 263.1678 173.5264 996.1213 466.2576 -0.4965194 0.05822682 0.8655609 -0.02970166 2
0.02145126 0.456196 3.608074 258.5244 162.2141 982.5726 433.6217 0 0 0 0 2
-0.05638861 0.2514243 3.72183 250.8078 183.7923 959.637 495.7692 0.3049983 0.6421899 -0.6253915 -0.3216421 1
-0.1186792 0.05188318 3.607477 244.3218 203.2379 941.2029 551.8748 -0.26478 0.9517155 -0.1056684 -0.1138568 1
-0.01467848 -0.1165264 3.480778 254.8065 220.7333 971.9523 602.4897 -0.08611581 -0.4083965 -0.3664471 0.8315725 1
0.02463763 -0.1719366 3.433349 258.9717 226.8045 984.1692 620.0498 -0.09458375 -0.4035454 -0.3958398 0.8194608 1
0.1114187 0.1966245 3.426533 268.2383 187.5125 1011.295 506.6487 -0.3492994 0.7050106 0.4374444 -0.4354221 2
0.1286983 -0.03043942 3.373097 270.2963 211.7945 1017.325 576.7807 -0.1017392 0.9596961 0.06538231 -0.253688 2
0.08228532 -0.2541101 3.357765 265.3107 236.1734 1002.779 647.1292 0.08782499 0.2879808 -0.0617637 0.9515982 2
0.0692029 -0.3098471 3.384366 263.8282 241.9865 998.3103 663.8867 0.1665458 0.2886318 0.175537 0.926359 2
-0.02360925 -0.3485841 3.586954 253.9402 244.0477 968.7792 669.7688 0.0685043 -0.6857342 0.7178305 -0.0989703 2
-0.06395935 -0.6859928 3.543022 249.7289 279.4901 956.5304 771.7064 0.07784405 -0.3475274 -0.03969007 0.9335897 2
0.1563699 -1.006306 3.725632 271.7743 307.7695 1018.998 852.8412 -0.2854941 -0.04644244 0.2135986 0.9331194 1
0.07683644 -1.075236 3.735645 263.9113 314.3329 996.2568 871.5995 0 0 0 0 2
0.05557406 -0.3448806 3.527986 262.111 244.2589 992.6514 670.4285 -0.3797515 0.5983997 0.624052 -0.3290375 2
0.0737009 -0.6952812 3.516986 264.033 280.9931 997.8915 776.0978 -0.02559393 0.8933973 0.016058 0.4482503 2
0.1472996 -1.006165 3.548124 271.6125 312.7624 1019.229 867.129 0.002622465 0.9215676 0.1254455 0.3673823 2
0.1283644 -1.078266 3.550482 269.6487 320.2213 1013.483 888.4661 0 0 0 0 2
0.06041014 0.257528 3.569052 262.5381 182.1078 994.204 491.0026 -0.4967511 0.04638972 0.86659 -0.01039257 2
0.06842956 -0.2250704 3.358553 263.7988 233.0015 998.4348 637.9681 0 0 0 0 2
-0.02198839 -0.2249234 3.440561 254.0112 232.4005 969.7466 636.1702 0 0 0 0 2
0.04306538 -0.3833923 3.322292 261.0919 250.7275 990.6346 689.0643 0 0 0 0 2
0.1175084 -0.33476 3.398231 269 244.5384 1013.159 671.2708 0 0 0 0 2
```

FIG. 13

FIG.(a) is the skeleton weight distribution of the global action

FIG.(b) is the skeleton weight distribution of tennis action

INTERACTIVE BEHAVIOR UNDERSTANDING METHOD FOR POSTURE RECONSTRUCTION BASED ON FEATURES OF SKELETON AND IMAGE

TECHNICAL FIELD

The present invention relates to the field of human behavior understanding, in particular to an interactive behavior understanding method for posture reconstruction based on features of skeleton and image.

BACKGROUND ART

In the existing technology, the commonly used methods for human behavior understanding comprise behavior understanding algorithm based on human body posture estimation and target detection algorithm based on image information, wherein, the advantage of human body posture classification algorithm relies on human skeleton key points is that the human skeleton key points information removes the redundant noise information in the image and guarantees the pure behavior information, but completely discarding the image information will cause the loss of effective information. The target detection algorithm relies on images that can obtain enough image features and human body features, but there is a lot of noise interference information, which is not conducive to behavior understanding.

The model can quickly and accurately extract the complete human skeleton information through the lightweight improvement of the Open Pose algorithm, occlusion prediction, and three-dimensional human body posture estimation algorithm. However, algorithms that rely solely on human skeleton information do not perform well on interactive behavior. It is easy to misjudge some 'human-object' interaction behaviors, such as playing badminton and tennis, reading with both hands, and holding a water cup with both hands. Meanwhile, the performance for some 'human-human' interaction behaviors, such as stealing, fighting, and hugging is still not good when simply using skeleton data to distinguish. The reason is that the simple skeleton data completely abandons the image features, that is, the environmental perception ability of the model is not considered.

In order to comprehensively utilize the advantages of skeleton features and image features, and enhance the model's environmental perception ability and interactive behavior understanding, it is necessary to propose an interactive behavior understanding method for posture reconstruction based on features of skeleton and image to further improve the accuracy of the model, which can quickly and accurately extract effective image features.

SUMMARY

The objective of the present invention is to provide an interactive behavior understanding method for posture reconstruction based on features of skeleton and image, it not only retains the purity of skeleton features for human behavior information extraction, but also uses image features to retain effective image information such as environment, so as to further complement the model features information, and the skeleton features are extracted by the graph convolution network, which increases the relevance of the input skeleton point information and obtains the accurate skeleton features, the effective image features can be extracted quickly and accurately through the Vision Transformer network combined with the multi-head attention mechanism.

In order to achieve the above objective, the present invention provides an interactive behavior understanding method for posture reconstruction based on features of skeleton and image, the specific steps are as follows:

S1, construction and preprocessing of a data set;

S2, extraction of skeleton features: firstly, introducing a Bahdanau attention neural network to obtain skeleton data of human body posture with different weights; then establishing a directed graph model of human body posture via graph convolution neural network to extract accurate skeleton features;

S3, extraction of image features: firstly, while acquiring three-dimensional skeleton data, reserving two-dimensional skeleton data to acquire human regions in images and extracting effective image features; then, introducing the skeleton expansion coefficient 2 as a trainable parameter, and training the trainable parameter via a neural network;

S4, fusion and reconstruction of features: after acquiring skeleton features and image features of a same dimension, fusing and inputting the two features together into a classification network;

S5, experimental evaluation and validation.

Preferably, in step S1, the construction and preprocessing of the data set comprise:

S11, construction of the data set: extraction of skeleton features, firstly, extracting a two-dimensional skeleton information of the human via improved OpenPose® algorithm, and then generating a complete three-dimensional human skeleton data as the skeleton data via an occlusion prediction network and a three-dimensional human body posture estimation.

Preferably, in step S11 construction of the data set, the steps of a three-dimensional human body posture estimation algorithm in the case of occlusion are as follows:

S111, preprocessing of the data set;

S112, generative antagonistic interpolation network;

S113, posture occlusion prediction network architecture;

S114, three-dimensional human body posture estimation;

S115, experimental analysis and validation.

Preferably, in step S2, the steps of the extraction of skeleton features are as follows:

S21, skeleton features weight network: for the three-dimensional posture data input in step S1, performing a basic initialization weight distribution, and setting an attention weight by normalizing an activation function, the specific formula is as follows:

$$\alpha_{ij} = \frac{\exp(\text{score})}{\sum_{j=1}^{n}\exp(\text{score})};$$

where $$\sum_{j=1}^{n}\alpha_{ij} = 1,$$

a value score is a correlation function between input and output, which is defined as follows:

$$\text{score} = v * \tanh\left(r_j \odot \sum_{i=1}^{n} x_i\right);$$

where v denotes an offset vector, which is a parameter that can be trained in the model, $x_i$ denotes an input matrix vector, $r_j$ is a feature probability. The feature weights of different skeleton points are shown below:

$$w_{ij} = v * \alpha_{ij}$$

S22, graph convolution network: a convolution layer operation is obtained via a convolution operation of a signal x and a signal g, where the signal x denotes an input graph information, and the signal g denotes a convolution kernel, the convolution operation of the two is obtained via Fourier transform, where an F function denotes the Fourier transform, which is used to map the signal to the Fourier domain, as shown below:

$$x * g = F^{-1}(F(x) \odot F(g)).$$

Preferably, in step S3 image features extraction, each encoder is composed of two sub-modules: a multi-head attention module and a feedforward neural network module, as shown below:

$$z_1' = MSA(LN(z_{l-1})) + z_{l-1},\ l = 1,\ \ldots L;$$
$$z_1 = MSA(\mathrm{LN}(z_1')) + z_1',\ l = 1,\ \ldots L.$$

Preferably, in step S4 fusion and reconstruction of features, the Wide module consists of a linear module $y=w^Tx+b$, where x denotes an input feature vector in the form of $x=[x_1,x_2 \ldots ,x_n]$, $w=[w_1, w_2 \ldots , w_n]$ is a model training parameter, and b denotes a model bias term; the input fusion features comprise original input feature vectors and transformed feature vectors, where the transformed features are obtained by cross product transformation, as shown below, where $c_{ki}$ denotes a Boolean variable, that is, if the i-th is a part of the k-th transformation $\varphi_k$, then it is 1, otherwise it is 0:

$$\phi_k(x) = \prod_{i=1}^{n} x_i^{c_{ki}},\ c_{ki} \in \{0, 1\};$$

the specific meaning of forward propagation is as follows, where $a_{(l+1)}$ denotes an output of a l+1 layer, and σ denotes an activation function:

$$a_{(l+1)} = \sigma(W_{(l)}a_{(l)} + b_{(l)});$$

a loss function is used to calculate a loss, optimize model parameters, and optimize the algorithm via a small batch gradient descent, where y denotes a prediction category label, σ denotes the activation function, φ(x) denotes a cross product transformation, x denotes the input feature vector, a final output probability expression of the model is as follows:

$$P(y \mid x) = \sigma\left(W_{wide}^T[x,\ \phi(x)] + W_{deep}^T a_l + b\right).$$

Preferably, in step S5 experimental evaluation and validation, a model training environment is ed in the Windows10® environment, using CUDA 10.1® to establish the GPU environment for training, and Python 3.6.5® as a compiler.

Therefore, the present invention adopts the above-mentioned interactive behavior understanding method for posture reconstruction based on features of skeleton and image, it not only retains the purity of skeleton features for human behavior information extraction, but also uses image features to retain effective image information such as environment, so as to further complement the model feature information, and the skeleton features are extracted by the graph convolution network, which increases the relevance of the input skeleton point information and obtains the accurate skeleton features, the effective image features can be extracted quickly and accurately through the Vision Transformer network combined with the multi-head attention mechanism.

Further detailed descriptions of the technical scheme of the present invention can be found in the accompanying drawings and embodiments.

BRIEF DESCRIPTION OF THE DRAWINGS

FIG. 1 is a part skeleton data of the behavior understanding of an interactive behavior understanding method for posture reconstruction of the present invention;

FIG. 13 is an NTU-RGB+D part of a skeleton data of the present invention;

FIG. 19(*b*) is a skeleton weight distribution of tennis action;

DETAILED DESCRIPTION OF THE EMBODIMENTS

Figure 2:
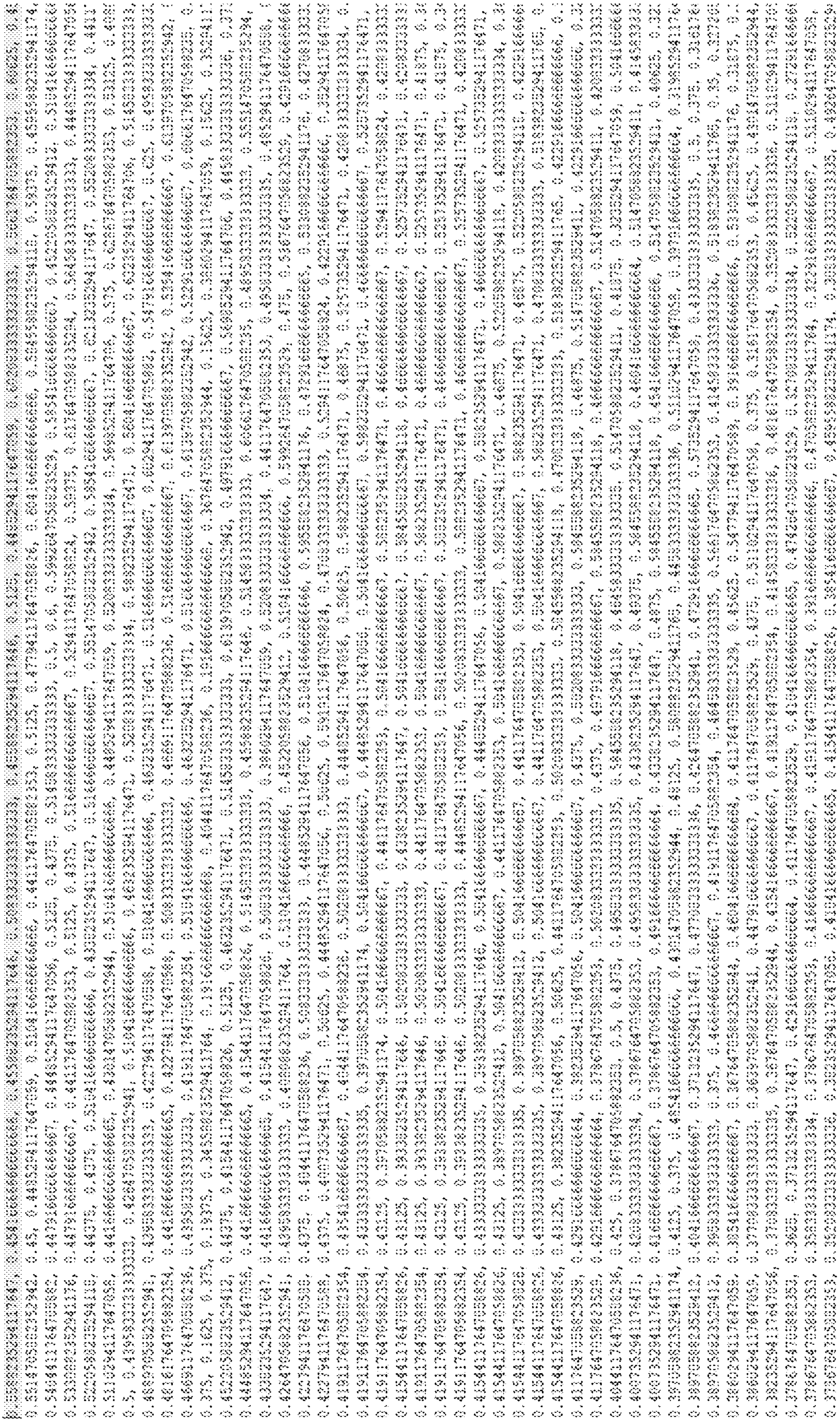
FIG. 2 is an occlusion prediction data set of an interactive behavior understanding method for posture reconstruction of the present invention.

The technical scheme of the present invention is further explained below by drawings and embodiments.

S1, Construction and Preprocessing of a Data Set the data set of the present invention uses a self-constructed interactive behavior data set and a public behavior understanding data set NTU-RGB+D, respectively. The self-constructed human behavior samples comprise 'human-object' interaction behavior, 'human-human' interaction behavior, and routine action, wherein, the 'human-object' interaction behavior samples set up badminton action and tennis action, reading book action and holding water action, that is, the collected samples are similar behaviors of 'human-object' interaction; the 'human-human' interaction behavior collects multiplayer interaction behaviors such as stealing, fighting, and hugging; routine actions comprise individual behaviors such as walking, standing, running, and falling. In order to ensure the universality of data and improve the robustness of the model, a variety of target object behavior data with different heights and body shapes are collected as samples. The training samples are obtained by on-site camera sampling and network collection, and then the pictures are scaled to 640×480 size, each type of action is sampled 200 pictures, a total of 4000 pictures.

S11, Construction of the Data Set extraction of skeleton features, firstly, a two-dimensional skeleton information of the human is extracted via improved OpenPose algorithm, and then a complete three-dimensional human skeleton data is generated as the skeleton data via an occlusion prediction network and a three-dimensional human body posture estimation. Wherein part skeleton data collected are shown in FIG. 1, each row denotes a three-dimensional coordinate $(x_i, y, z)$ of its human body posture, after three-dimensional human body posture estimation and occlusion prediction, 16 sets of data are obtained, denoting the skeleton information of an action of a single human.

Wherein, in step S11 construction of the data set, the steps of a three-dimensional human body posture estimation algorithm in the case of occlusion are as follows:

S111, Preprocessing of the Data Set the data set consists of two parts, one is based on the generative antagonistic interpolation network to realize the occlusion prediction of three-dimensional human body posture, and the experiment needs to use the COCO human body posture data set. The second is to map the two-dimensional human body posture data to the three-dimensional human body posture data, the data set used in the experiment is the public data set Human3.6M data set.

1. Occlusion Prediction Data Set the focus of the occlusion prediction data set is the establishment of complete human skeleton key point data, that is, it is necessary to provide the model with a human body posture data set with missing data and a complete human body posture data set without missing data. The missing data set can be constructed by missing random positions in the complete data set, so the occlusion prediction data set can directly predict the key points of human skeleton in the COCO data set.

In order to make the occlusion prediction have good universal applicability and adapt to different individuals and multiple target behaviors. The present invention chooses to use the image data in the COCO human body posture data set, and divides it into multiple actions to extract the key points of human skeletons via the improved OpenPose® algorithm, and saves the complete key point data of human skeletons as a training data set. As shown in FIG. 2, is some of the human skeleton key point data sets, each row in the figure denotes human body posture data of the extracted object, and the data is stored in floating point numbers to ensure sufficient accuracy.

2. Human3.6M Human Body Posture Data Set

Figure 3:
FIG. 3 is a IHuman3.6M partial data set of an interactive behavior understanding method for posture reconstruction of the present invention.

The Human3.6M data set is by far the largest public data set for three-dimensional human body posture estimation. The data set collection target is seventeen actions performed by eleven professional actors, such as walking, calling, and participating in discussion, etc., for a total of 3.6 million samples. The data acquisition device uses 4 video cameras and 10 motion cameras, and the shooting area is 12 square meters. Wherein four cameras are shot from different angles as video data from different perspectives, and coordinate data of the key points of the three-dimensional human skeleton are collected by a motion capture device. Part of the video data in Human3.6M is shown in FIG. 3.

In order to ensure the consistency between the data of the Human3.6M data set and the OpenPose® algorithm structure, it is necessary to preprocess the data and align the positional relationship of different skeleton points. The skeleton point correspondence between the two is shown in the following table.

TABLE 1

The relationship between Human3.6M data set and OpenPose ® human body posture structure

| Human3.6 data set | | Corresponding | Improved OpenPose ® model | |
|---|---|---|---|---|
| Joint id | Corresponding meaning | relationship Joint id | Joint id | Corresponding meaning |
| 0 | Hip | (8 + 11)/2 | 0 | Nose |
| 1 | Right hip | 8 | 1 | Neck |
| 2 | Right knee | 9 | 2 | Right shoulder |
| 3 | Right foot | 10 | 3 | Right elbow |
| 6 | Left hip | 11 | 4 | Right wrist |
| 7 | Left knee | 12 | 5 | Left shoulder |
| 8 | Left foot | 13 | 6 | Left elbow |
| 13 | Neck | 1 | 7 | Left wrist |
| 14 | Chin | 0 | 8 | Right hip |
| 15 | Head | (14 + 15)/2 | 9 | Right knee |

TABLE 1-continued

The relationship between Human3.6M data set and OpenPose ® human body posture structure

| Human3.6 data set | | Corresponding | Improved OpenPose ® model | |
|---|---|---|---|---|
| Joint id | Corresponding meaning | relationship Joint id | Joint id | Corresponding meaning |
| 17 | Left shoulder | 5 | 10 | Right ankle |
| 18 | Left elbow | 6 | 11 | Left hip |
| 19 | Left wrist | 7 | 12 | Left knee |
| 25 | Right shoulder | 2 | 13 | Left ankle |
| 26 | Right elbow | 3 | 14 | Right eye |
| 27 | Right wrist | 4 | 15 | Left eye |

After obtaining the two-dimensional skeleton data, a nonlinear model is established to learn the mapping relationship between two-dimensional data and three-dimensional data. The input of the nonlinear network is designed as two-dimensional human body posture data $X \in R^{2n}$, the network output form is $Y \in R^{3n}$, and a learning function expression of the nonlinear network is $G^*: X \in R^{2n} \rightarrow Y \in R^{3n}$, the purpose of minimizing the mean square error between the network predicted result and the real result is achieved by optimizing the model parameters, the specific meaning is as follows, where $\xi$ denotes its loss function, and here is the mean square error loss function:

$$G* = \min_G \frac{1}{N} \sum_{i=1}^{N} \xi(G(X_i - Y_i));$$

the hip joint of the three-dimensional skeleton structure of the human body is set as the coordinate center point according to the official standard of the Human3.6M data set, the transformation from the world coordinate system to the camera coordinate system is realized through a series of rotation and translation transformations, that is, the rigid body transformation conforming to the right-hand coordinate system.

Figure 4:
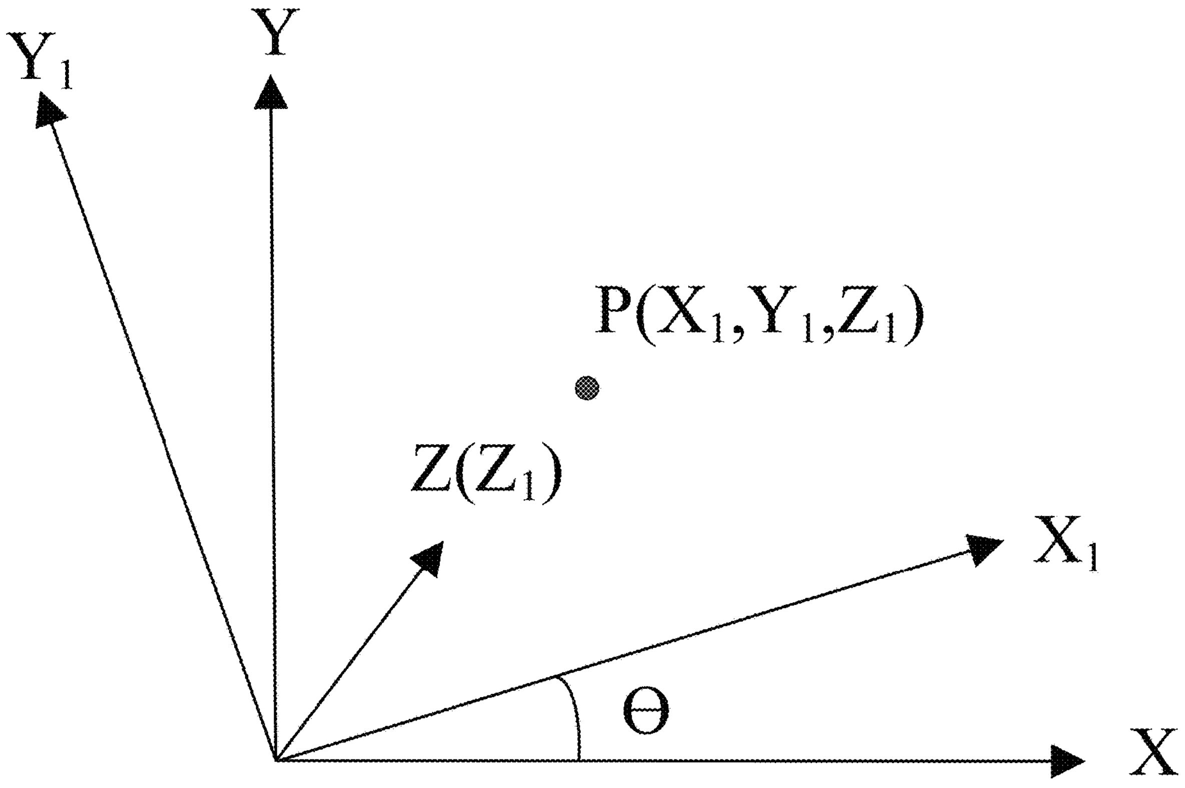
FIG. 4 is a transformation relationship (Z-axis rotation) between a world coordinate system and a camera coordinate system.

The transformation relationship between the world coordinate system and the camera coordinate system is shown in FIG. 4. Taking Z-axis rotation as an example. Wherein O-X1Y1Z1 denotes the world coordinate system, O-XYZ denotes the camera coordinate system, and θ denotes an angle between X and X1, the specific transformation formula is as follows:

$$\begin{cases} X = X_1 \cos\theta - Y_1 \sin\theta \\ Y = X_1 \sin\theta + Y_1 \cos\theta \\ Z = Z_1 \end{cases} \Leftrightarrow \begin{bmatrix} X \\ Y \\ Z \end{bmatrix} = \begin{pmatrix} \cos\theta & -\sin\theta & 0 \\ \sin\theta & \cos\theta & 0 \\ 0 & 0 & 1 \end{pmatrix} \begin{bmatrix} X_1 \\ Y_1 \\ Z_1 \end{bmatrix} = R_1 \begin{bmatrix} X_1 \\ Y_1 \\ Z_1 \end{bmatrix};$$

similarly, the formulas for calculating the rotation angles α and β according to the X and Y axes are as follows:

$$\begin{bmatrix} X \\ Y \\ Z \end{bmatrix} = \begin{pmatrix} 1 & 0 & 0 \\ 0 & \cos\alpha & \sin\alpha \\ 0 & -\sin\alpha & \cos\alpha \end{pmatrix} \begin{bmatrix} X_1 \\ Y_1 \\ Z_1 \end{bmatrix} = R_2 \begin{bmatrix} X_1 \\ Y_1 \\ Z_1 \end{bmatrix}$$

$$\begin{bmatrix} X \\ Y \\ Z \end{bmatrix} = \begin{pmatrix} \cos\beta & 0 & -\sin\beta \\ 0 & 1 & 0 \\ \sin\beta & 0 & \cos\beta \end{pmatrix} \begin{bmatrix} X_1 \\ Y_1 \\ Z_1 \end{bmatrix} = R_3 \begin{bmatrix} X_1 \\ Y_1 \\ Z_1 \end{bmatrix}$$

a rotation matrix R can be obtained then according to $R_1$, $R_2$, $R_3$:

$$R = R_1 R_2 R_3$$

finally, the transformation relationship between the world coordinates and the camera coordinates can be obtained, as shown below. Where $(X_W, Y_W, Z_W)$ is an absolute coordinate of the point, $(X_C, Y_C, Z_C)$ is a camera coordinate of the point, R is the rotation matrix, and T is defined as an offset vector.

$$\begin{bmatrix} X_C \\ Y_C \\ Z_C \end{bmatrix} = R \begin{bmatrix} X_W \\ Y_W \\ Z_W \end{bmatrix} + T$$

after obtaining the transformed coordinates, the data is normalized, and the data set is divided into a training set and a test set, wherein, the data collected by the experimenter numbered (1,5,6,7,8) is the training set, and the experimenter (9,11) data is set as the test set, and the mean square error between the predicted value and the real value is used as an evaluation criterion of the model. The steps of normalization calculation are as follows, where p and a are the mean and standard deviation of the sample respectively, x denotes an original data, and x' denotes a normalized data;

$$x' = \frac{x - \mu}{\sigma}.$$

Figure 5:
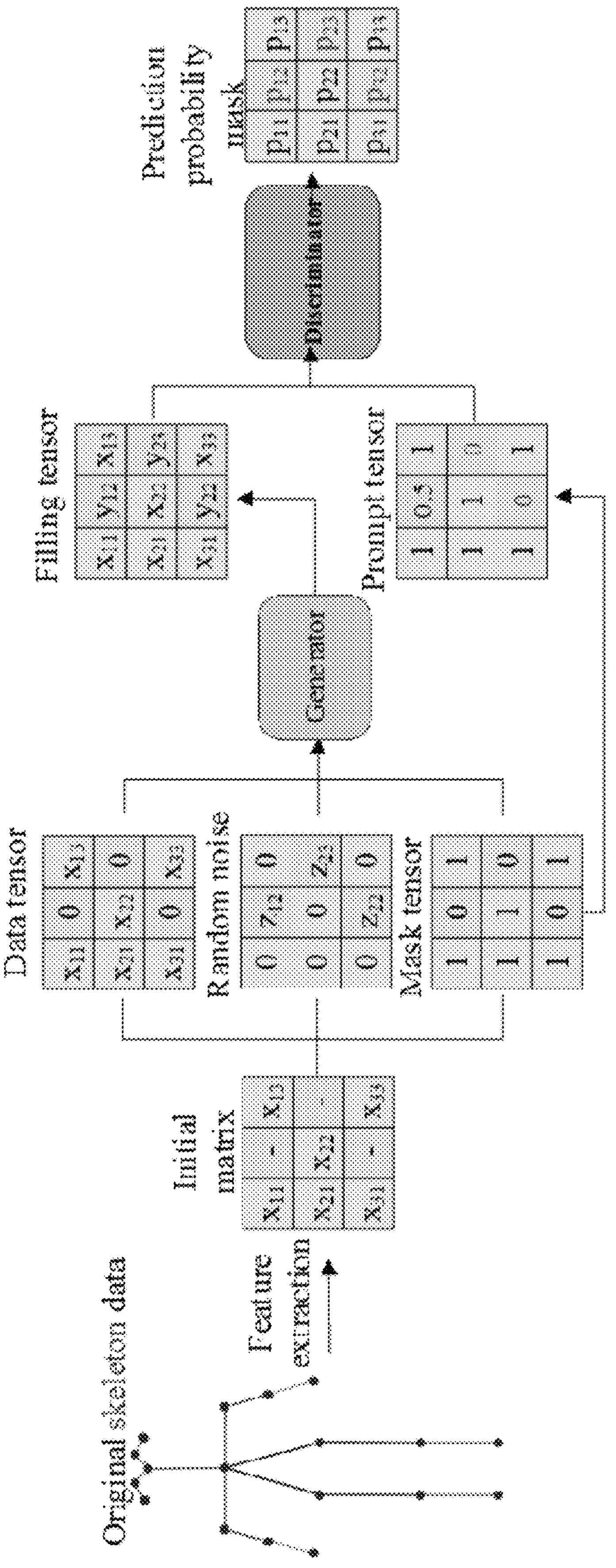
FIG. 5 is a generative antagonistic interpolation network structure diagram of an interactive behavior understanding method for posture reconstruction of the present invention.

S112, Generative Antagonistic Interpolation Network the human body posture architecture has certain regularity, so the correlation of skeleton point position can be learned by neural network, so as to realize the prediction of missing data of human skeleton key points under occlusion. The present invention realizes the prediction of missing human skeleton key points by establishing a generative antagonistic interpolation network to obtain complete human skeleton key point information. The generator is used to predict missing data and optimize model parameters by continuously reducing model losses. The discriminator is used to distinguish the predicted results from the real results, so as to achieve the purpose of antagonizing the generator, so that the predicted output of the generator is closer to the real. The generative antagonistic interpolation network structure diagram, as shown in FIG. 5:

the specific process is as follows: firstly, three matrices are generated based on the input data, which are the original data, random noise, and mask matrices containing 0 and 1, respectively. In the mask matrix, 0 denotes that the location data is missing, and 1 denotes that the value of the location is not missing. Then, the three matrices are input into the generator, and the predicted values of the generator and the original missing data are interpolated and predicted at the missing position as the final output result. Finally, the output result of the generator and the mask matrix are input into the discriminator, which is used to determine the non-missing probability of missing data position in the mask vector.

1. Generator Network the input of the generator is composed of an original data tensor X, a random noise tensor Z, and a mask matrix M, define X' as a generator output matrix, $\hat{X}$ as a predicted output matrix, which is composed of the predicted value on the missing position and the non-missing real value, d denotes a dimension of the data, a function operation G of the generator is as follows:

$$G: X \times \{0, 1\}^d \times [0, 1]^d$$

The generator output matrix X' and predictive result matrix $\hat{X}$ are as follows:

$$X' = G(X, M, (1-M) \odot Z);$$

$$\hat{X} = M \odot X + (1-M) \odot X';$$

Where $\odot$ denotes the Hadamard product, multiplied by element by element.

2. Discriminator Network the discriminator network D in the generative antagonistic interpolation network is used to antagonize the generator, but its goal is not to distinguish the real and fake of the sample, but to distinguish the real and fake probability of different locations as a predictive mask M. Then, the discriminator network D is trained to maximize the probability of correctly predicting the mask tensor, and the generator network G is trained to minimize the probability of the discriminator correctly predicting the mask tensor.

A prompt tensor H is introduced to determine the accurate mask value, that is, when it is 0.5, it means that the accurate value of M cannot be obtained from H, while when the value is 0 or 1, it means that the accurate value can be obtained, and E is an existential quantifier. Here the value V(D,G) is defined as follows:

$$V(D, G) = E_{(X,M,H)}\left[M^T \log D(\hat{X}, H) + (1-M)^T \log(1 - D(\hat{X}H))\right];$$

a network optimization objective is as follows:

$$\min_G \max_D V(D, G);$$

a defined loss function $\xi$:

$$\xi: \{0, 1\}^d \times \{0, 1\}^d \to \mathbb{R};$$

$$\xi(a, b) = \sum_{i=1}^{d} [a_i \log(b_i) + (1 - a_i \log(1 - b_i))];$$

then there is a predicted mask tensor $\hat{M}$=D($\hat{X}$,H), as shown below:

$$\min_G \max_D E\left[\xi(M, \hat{M})\right].$$

S113, Posture Occlusion Prediction Network Architecture;

the present invention realizes the effective understanding of human body posture expression by establishing the position information and correlation information of the key points of the human skeleton, and then realizes the occlusion prediction of human body posture data by constructing a generative antagonistic interpolation network.

Due to the lack of human skeleton data caused by occlusion, relying solely on joint position information can easily lead to the loss of effective features, that is, the loss of joint connection information and the loss of skeleton structure. The efficient use of features by the model is further improved by integrating the structural features of joints. Here, the position feature of the defined posture is denoted by the extracted skeleton position coordinate and an indicator scalar, when it is 0, it means that the position is missing, and when it is not 0 means that the position is not missing. The structural features of the joint are denoted by an association matrix, and the value of the element is composed of 0 and 1, 1 denotes that the joints of the row and column where the element is located are interconnected, and 0 denotes that the joints of the row and column where the element is located are not connected.

Figure 6:
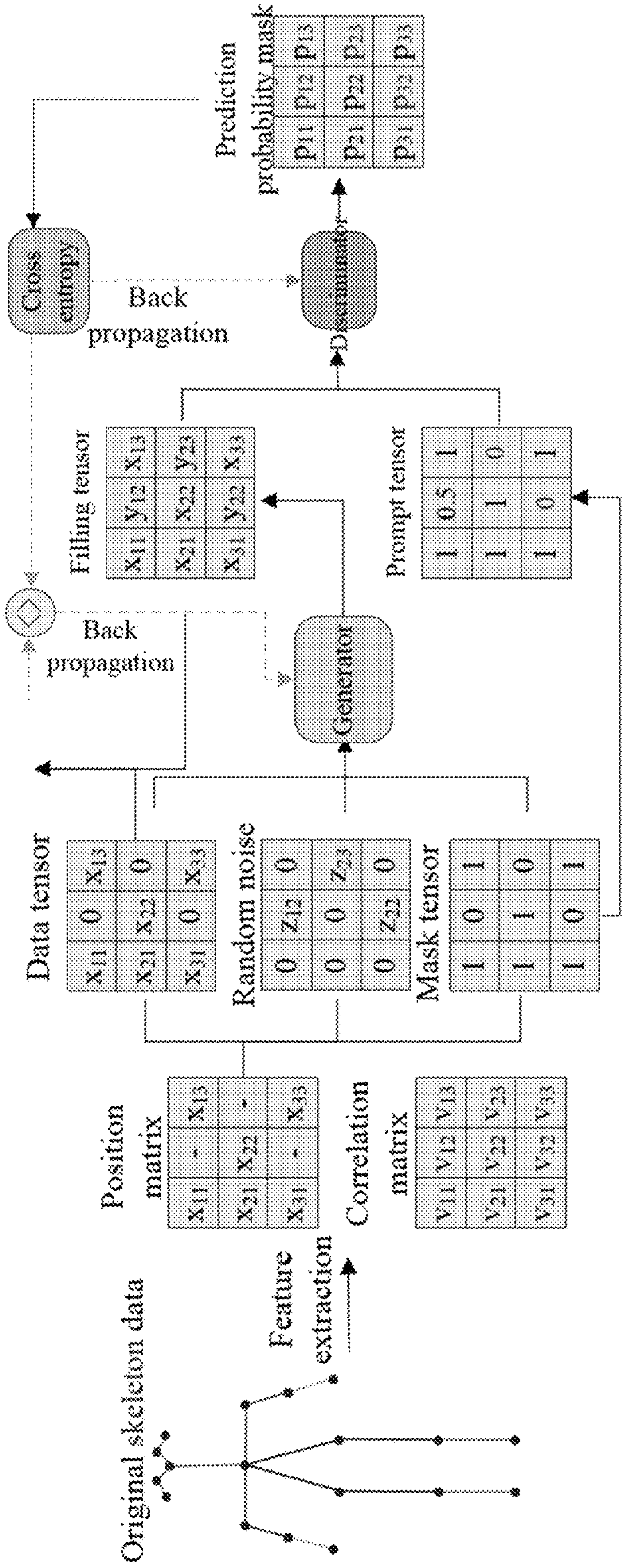
FIG. 6 is a posture occlusion prediction network structure diagram of an interactive behavior understanding method for posture reconstruction of the present invention.

The basic idea of generative antagonistic networks lies in the dynamic game process, and the final equilibrium point is the Nash equilibrium point. The training of the network is realized by fixing different trainers at different stages, meanwhile, the discriminator network needs to be trained first to avoid problems such as mode collapse. Wherein, when training the discriminator, it is necessary to first fix the generator, by introducing the missing data predicted by the generator and the original real data into the discriminator, the error is calculated and back-propagation is performed to update the discriminator parameters; when training the generator, the discriminator network needs to be fixed, and the predicted value output by the generator is input into the discriminator as a negative sample, the parameters of the generator are updated by back propagation according to the error of the discriminator. The specific network structure flow diagram is shown in FIG. 6.

S114, Three-Dimensional Human Body Posture Estimation;

The present invention realizes the three-dimensional mapping learning of two-dimensional human body posture data by designing a nonlinear model, so that the model can obtain sufficient spatial information and solve the problem that the key point information of human skeleton output from different perspectives is not uniform.

Figure 7:
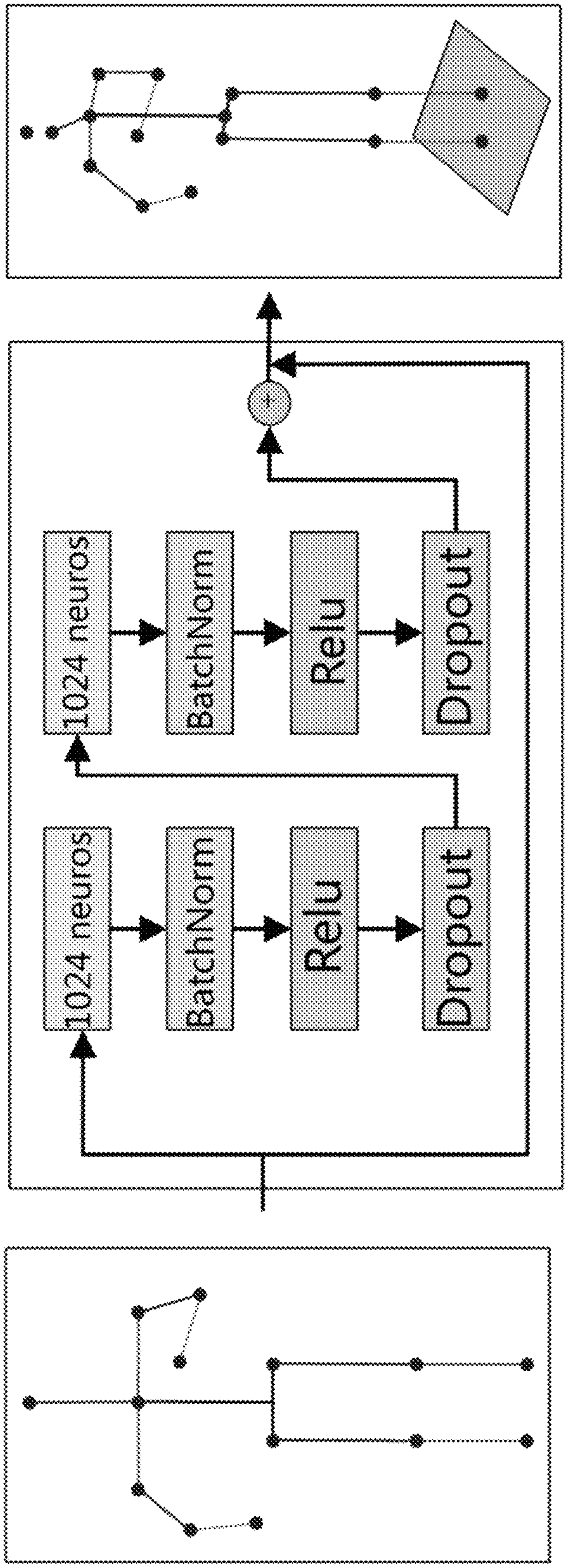
FIG. 7 is a nonlinear module network structure of an interactive behavior understanding method for posture reconstruction of the present invention.

1. Nonlinear Module Design each nonlinear model is set to be composed of 1024 neurons, BatchNorm normalization, ReLu activation function and Dropout layer, and then each nonlinear module is connected by residuals to prevent gradient disappearance during training. Then, BatchNorm normalization is introduced to constrain the neural network layer and ensure the stability of gradient echo, then, the nonlinear fitting of the model is realized by the ReLu activation function, and finally, the neurons are randomly inactivated by Dropout to prevent the model from overfitting during the training process, so that the model can obtain the optimal results. The nonlinear network structure is designed as shown in FIG. 7.

2. OWM Module by establishing a nonlinear network to learn the mapping relationship of three-dimensional human body posture data, the original OpenPose® two-dimensional human body posture data is converted into three-dimensional human body posture data, however, with the change of environment and the increase of the diversity of action categories, the nonlinear model is difficult to adapt to too many complex samples, which is easy to cause catastrophic forgetting. In this part, the OWM module is introduced to improve the generalization ability of the model and make the adaptability of the model stronger.

When learning a new sample, the OWM module modifies the weight value in the orthogonal direction of the feature solution space on the old task in order to retain the features learned before, so that the weight increment does not interact with the past task, so as to ensure that the solution sought in the new sample still exists in the previous solution space. Here, it is assumed that a previously trained input vector matrix set is A, a matrix I denotes a unit matrix, and α is a parameter, then the direction orthogonal to the input space needs to be found as shown below:

$$P = I - A\left(A^T A + \alpha I\right)^{-1} A;$$

where the correction of the weight parameter comprises the learning rate, as shown below, here λ denotes a learning rate, ΔW' is a back propagation weight change:

$$\Delta W = \lambda P \Delta W'$$

Figure 8:
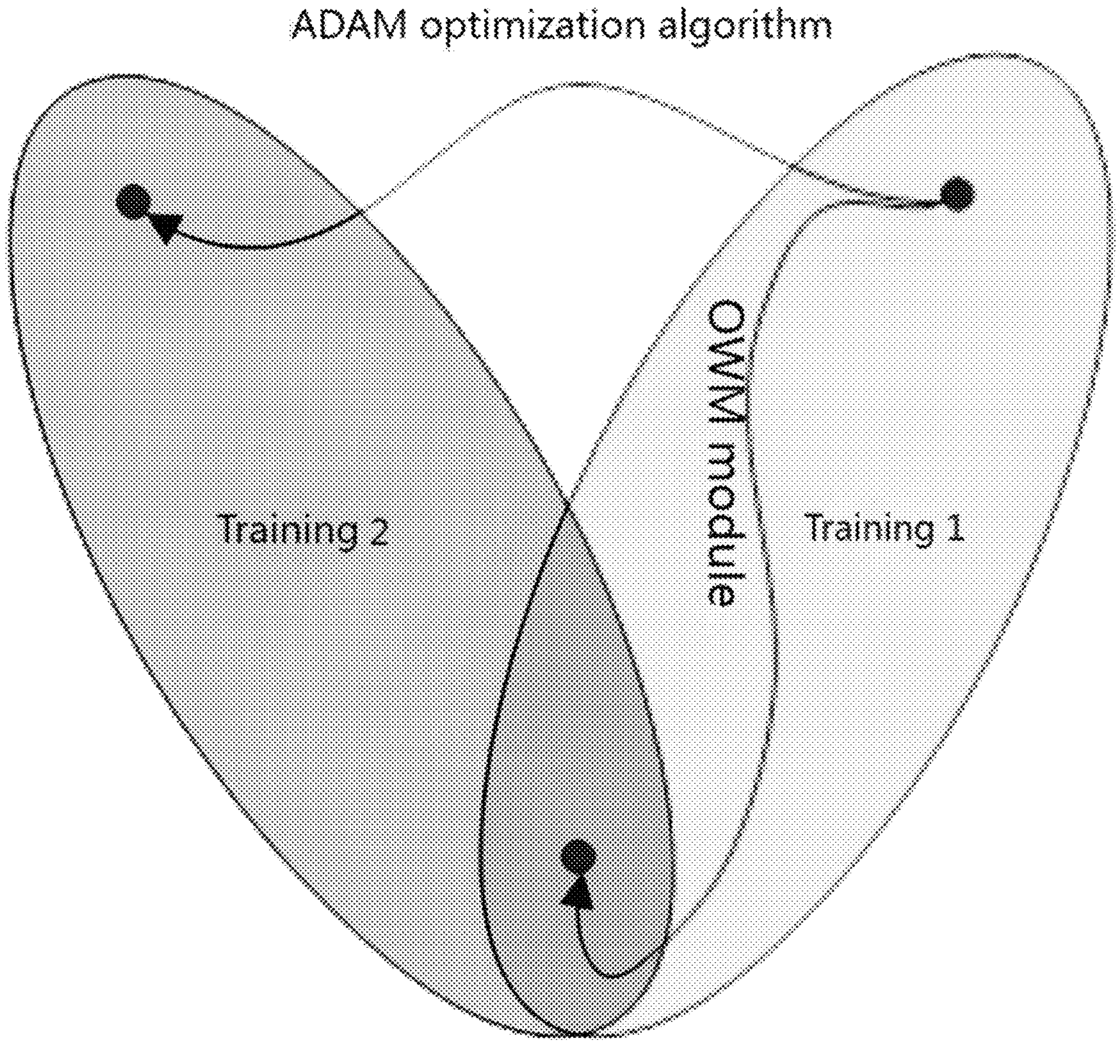
FIG. 8 is an OWM module schematic diagram of an interactive behavior understanding method for posture reconstruction of the present invention.

As shown in FIG. 8, it is an OWM module schematic diagram.

S115, Experimental Analysis and Validation the experiment of the present invention is divided into two parts: an occlusion prediction experiment and a three-dimensional human body posture estimation. Wherein the occlusion prediction experiment is evaluated by calculating the root mean square error of the real data and the predicted missing data, the three-dimensional human body posture estimation experiment is evaluated by calculating the error between the predicted three-dimensional coordinates and the real coordinate.

1. Occlusion Prediction Experiment the missing rate parameter is introduced to generate missing human body posture data, and experiments are carried out from 1 to 12 skeleton points according to the missing numbers, the generative antagonistic interpolation network GAIN_Pose introduced by the present invention is performed a comparative experiment with other algorithms, and compared with the machine learning algorithm MissForest and the deep learning algorithm MICE, respectively. The data missing are compared according to different missing numbers from 1 to 12 and different actions, and the evaluation index uses the root mean square error. The experimental environment of the occlusion prediction algorithm of the present invention is shown in Table 2.

TABLE 2

Occlusion prediction model training environment

| Category | Environmental parameter |
|---|---|
| Operating system | Windows 10 ® |
| CPU memory | 16G |
| Programming language | Python 3.6.5 ® |
| Deep learning framework | Keras ™ |
| Graphics card memory | Discrete graphics card 4G |

TABLE 2-continued

Occlusion prediction model training environment

| Category | Environmental parameter |
|---|---|
| CPU model | AMD Ryzen ™ 7 4800H with Radeon ™ Graphics |
| GPU model | NVIDIA Geforce ® GTX 1650 |

The specific model parameters for the setup are shown in Table 3.

TABLE 3

Training parameters of the occlusion prediction model

| Parameter name | Meaning | Parameter value |
|---|---|---|
| Optimizer | Optimizer | Adam |
| Init_lr | Initial learning rate | 0.001 |
| Epoch | Training times of all data sets | 5000 |
| BatchSize | Number of training batch samples | 128 |
| Init_BP | Initialization method of neural network | Kaiming |

As shown in Table 4, it is the error comparison table between the predicted value and the real value of the occlusion prediction comparison experiment on different actions. It can be found that the algorithm in this paper performs best in the prediction of missing human skeleton key points under occlusion, with an average error of only 0.0657, and performs better in the evaluation of simple actions such as standing and walking.

TABLE 4

Comparative experiment errors of occlusion prediction

| Design algorithm | Walking | Running | Standing | Sitting |
|---|---|---|---|---|
| Algorithm of this paper | 0.0595 | 0.0686 | 0.0552 | 0.0793 |
| MissForest | 0.0784 | 0.2032 | 0.0663 | 0.2245 |
| MICE | 0.0838 | 0.3365 | 0.0786 | 0.3569 |
| Auto-Encoder | 0.0824 | 0.2639 | 0.0793 | 0.2844 |

Figure 9:
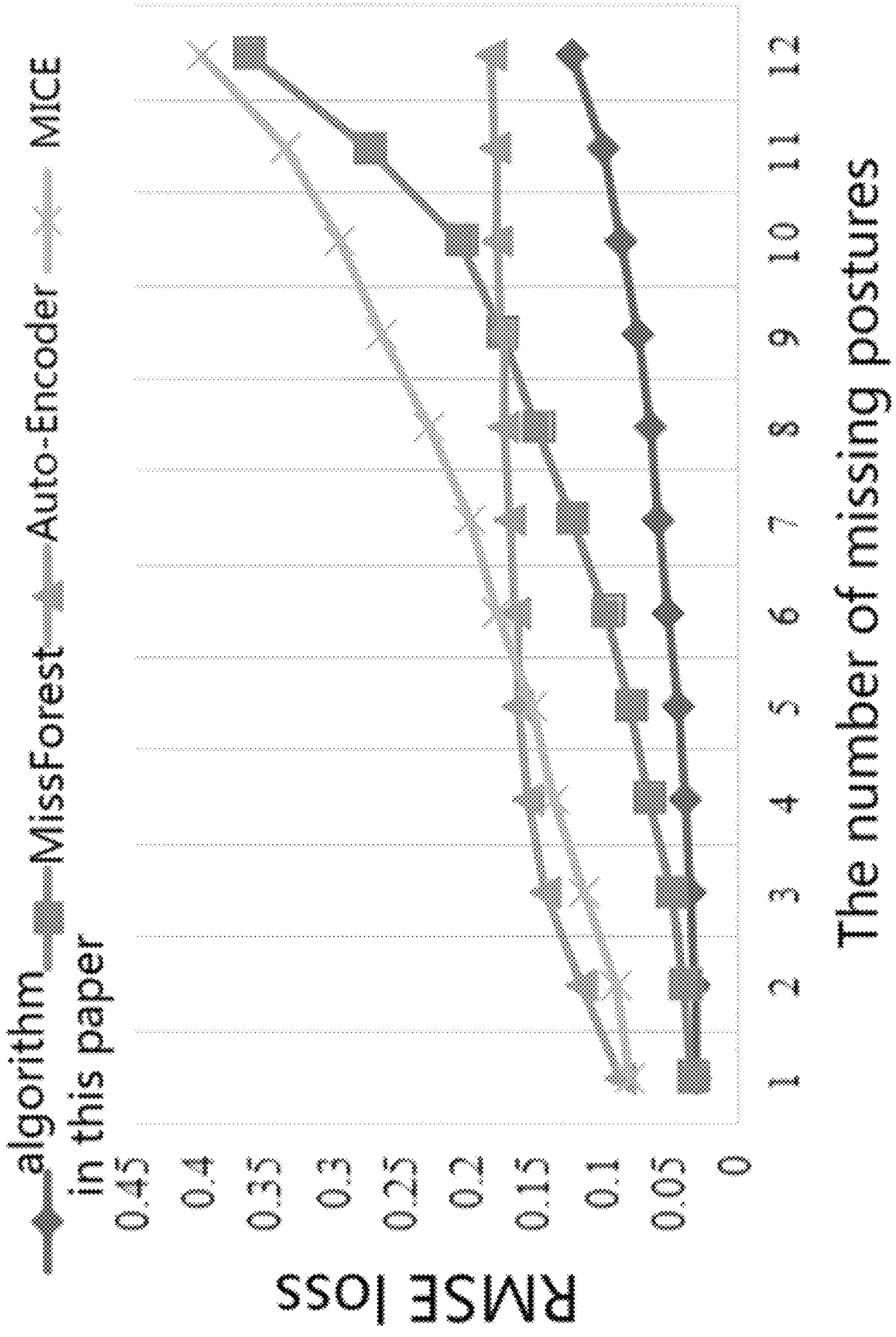
FIG. 9 is an experimental comparison of different posture missing values of an interactive behavior understanding method for posture reconstruction of the present invention.

As shown in FIG. 9, the effect diagram is compared and evaluated for the experimental comparison of each algorithm with different skeleton missing values. It can be seen that as the number of missing points increases, the loss of the model gradually increases. When the missing value is less than 9, the algorithm performs better, but the missing rate is too large and the change curve increases sharply, which is not suitable for the case of too much data missing.

Figure 10:
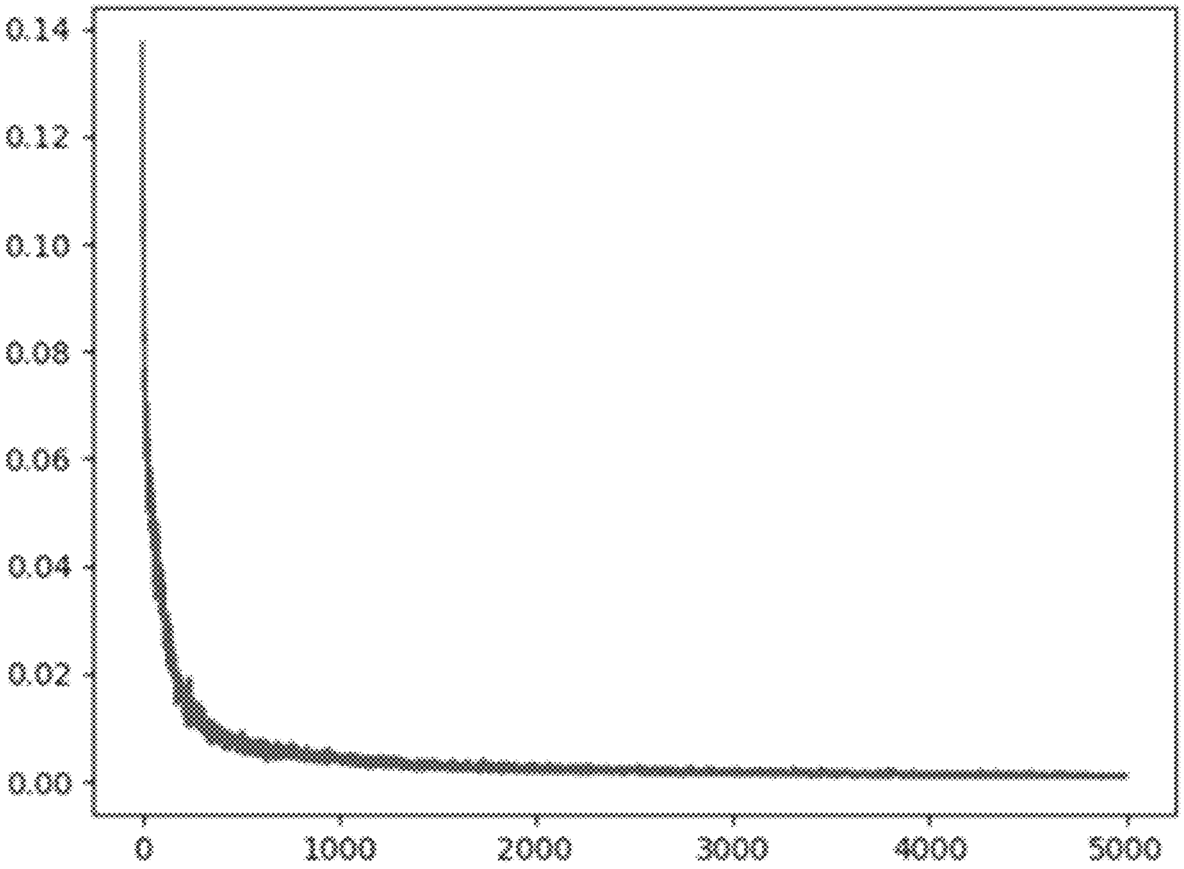
FIG. 10 is a Loss change curve of an occlusion prediction algorithm in the present invention.

As shown in FIG. 10, it is the Loss change curve during the training process of the algorithm in this paper. It can be seen from the diagram that the model fitting amplitude tends to be stable, and the loss value basically does not change around 4500 rounds, and the curve is fitted.

Figure 11:
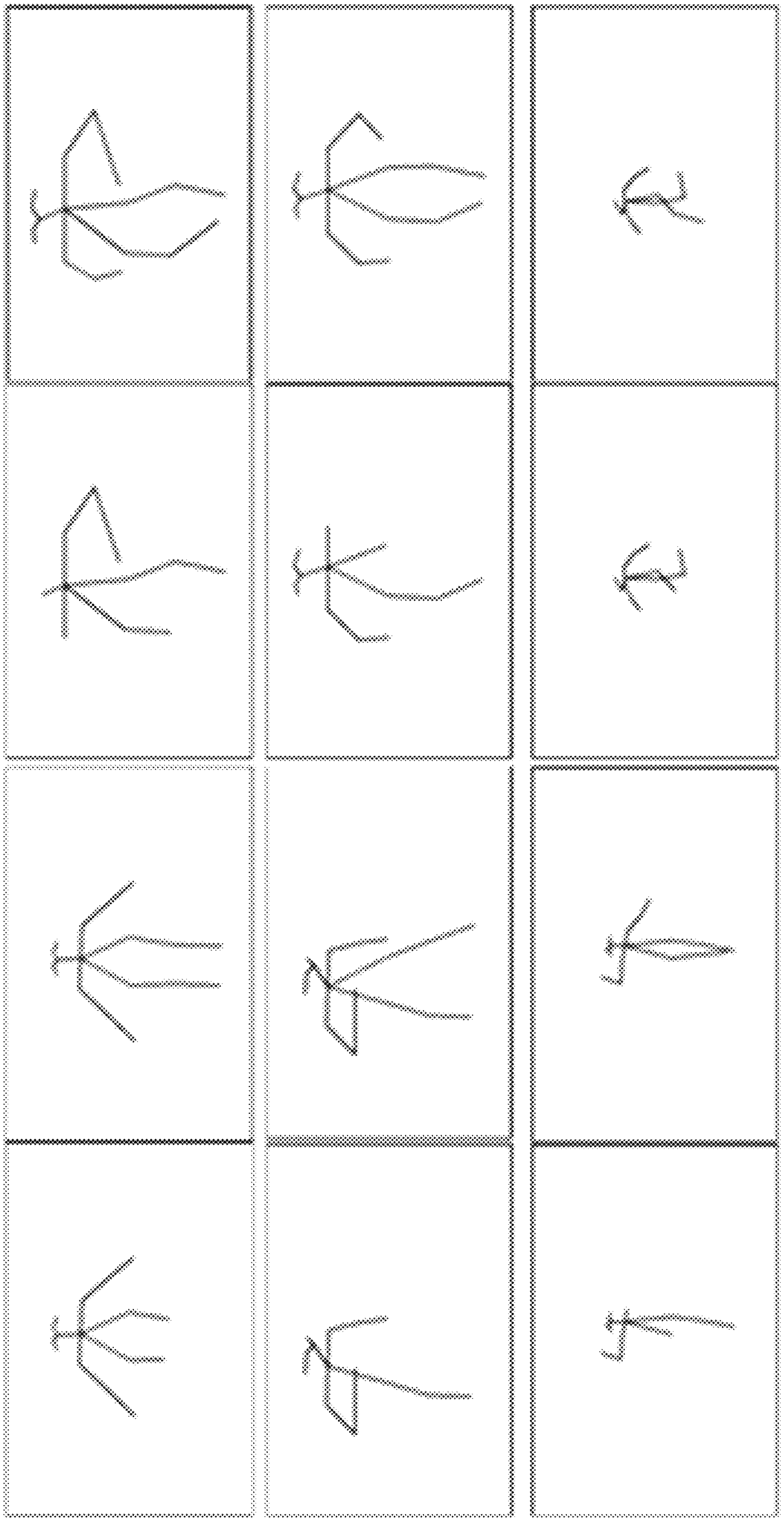
FIG. 11 is an occlusion prediction effect of an interactive behavior understanding method for posture reconstruction of the present invention.

As shown in FIG. 11, it shows the effect of occlusion prediction.

2. Three-Dimensional Human Body Posture Estimation Experiment in order to verify the effectiveness of the model structure, the proposed algorithm is compared with the nonlinear residual neural network, the maximum marginal neural network posture estimation algorithm, the motion compensation posture estimation algorithm, the convolution network three-dimensional posture estimation algorithm and the three-dimensional posture estimation algorithm based on image sequence.

The environment of the three-dimensional posture estimation experiment of the present invention is shown in Table 5, and the accelerated training is realized by GPU.

TABLE 5

Three-dimensional human body posture estimation model training environment

| Category | Environmental parameter |
|---|---|
| Operating system | Windows 10 ® |
| CPU memory | 16G |
| Script language | Python 3.6.5 ® |
| Deep learning framework | Tensorflow ® |
| CPU model | AMD Ryzen ™ 7 4800H with Radeon ™ Graphics |
| GPU model | NVIDIA Geforce ® GTX 1650 |

The experiment uses Adam as the optimizer, the training times of all data sets are 1000 rounds, and the initial learning rate is set to 0.001 and decays exponentially with the number of training times. BatchSize is set to 64, and the neural network is initialized by Kaiming to ensure the stability of gradient echo during training and improve the training speed of the model. The model training parameters are shown in Table 6:

TABLE 6

Training parameters of three-dimensional human body posture estimation model

| Parameter name | Meaning | Parameter value |
|---|---|---|
| Optimizer | Optimizer | Adam |
| Init_lr | Initial learning rate | 0.001 |
| Epoch | Number of iterations | 1000 |
| BatchSize | BatchSize | 64 |
| Init_BP(Initial Back Propagation) | Initialization method of neural network | Kaiming |

In order to verify the effect of the model, the distance error between the three-dimensional human skeleton key point data predicted by different algorithms and the original three-dimensional human skeleton key point data is calculated in millimeters. Validate on different actions such as Direct, Discuss, and Eating, and the resulting experiments are shown in Table 7:

TABLE 7

Evaluation effect of three-dimensional human body posture estimation experiment

| Algorithm | Direct | Discuss | Eating | Greet | Photo | Sitting |
|---|---|---|---|---|---|---|
| Algorithm of this paper | 48.6 | 53.8 | 50.5 | 52.9 | 86.3 | 83.6 |
| Nonlinear residual network | 62.3 | 68.2 | 64.3 | 59.6 | 92.7 | 88.8 |
| Maximum Marginal Neural Network | 101.5 | 138.4 | 98.8 | 125.8 | 172.4 | 149.6 |
| Motion compensation algorithm | 103.6 | 149.2 | 89.3 | 127.4 | 193.6 | 141.3 |
| Convolution neural network algorithm | 80.9 | 82.3 | 79.2 | 81.6 | 89.3 | 85.2 |
| Image sequence | 85.6 | 114.7 | 106.3 | 111.5 | 137.2 | 122.4 |

Figure 12:
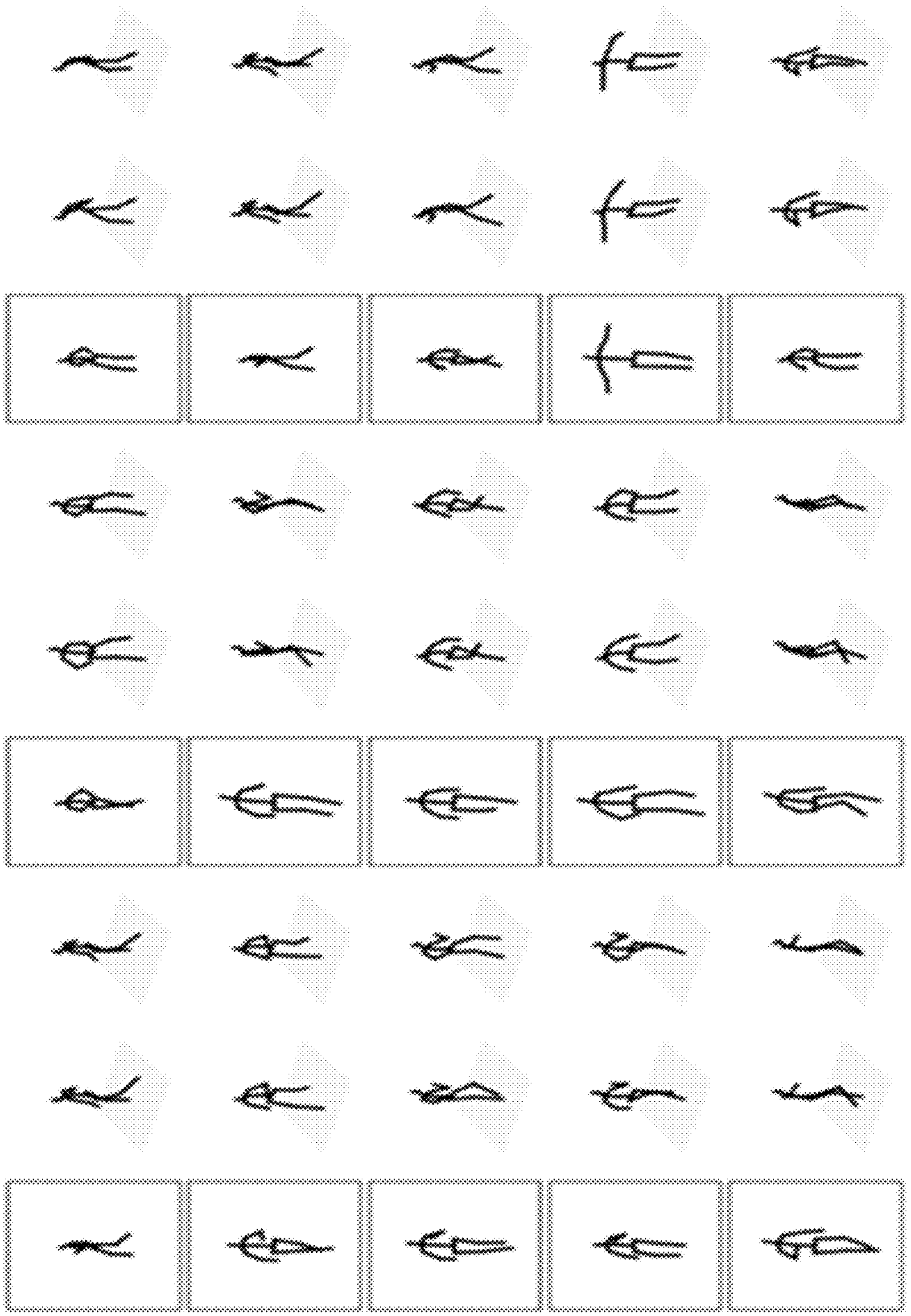
FIG. 12 is a performance effect of a three-dimensional human body posture estimation of the present invention.

As shown in FIG. 12, it is the test effect of the three-dimensional human body posture estimation in this paper.

Aiming at the problem of missing human skeleton point data under occlusion and the problem of missing three-dimensional spatial information of two-dimensional skeleton data in the human body posture estimation algorithm, the occlusion prediction network and three-dimensional human body posture estimation model are established respectively. Wherein, the generative antagonistic interpolation network comprehensively uses the skeleton point tensor and the human body correlation tensor to predict the missing data of the human under occlusion, and compared with the interpolation algorithms such as MissForset, the effectiveness of the proposed algorithm for occlusion missing data is verified, and the error of the prediction performance is reduced by 54.1% on average compared with the experimental optimal algorithm. In addition, two-dimensional to three-dimensional human body posture estimation is realized by constructing a nonlinear network. Meanwhile, in order to improve the generalization ability of the model and enhance the continuous learning ability of the model, the OWM module is introduced into the network, and the experimental verification is carried out on the Human3.6M data set, compared with the algorithm such as the maximum marginal neural network, the distance error between the predicted value and the real value is used as the evaluation index, the error of the optimal algorithm is reduced by 13.8% on average in the experimental performance, which verifies the effectiveness of the improvement measures.

S12, NTU-RGB+D Data Set

As shown in FIG. 13, it is the NTU-RGB+D part of the skeleton data set. The NTU-RGB+D public data set, collected by the Rose Lab laboratory, contains 56,880 sample data and is divided into 60 behaviors, comprising 40 categories of daily behaviors and 11 categories of 'human-human' interaction behaviors. The data set comprises RBG images, depth information, three-dimensional human skeleton data, etc.

S2, Extraction of Skeleton Features the complete three-dimensional human skeleton information has the inherent structural law of the human body, the conventional skeleton-based behavior understanding method is to use the human body posture estimation algorithm to predict the key points of the skeleton and then classify them, without considering the regularity of the human body structure, that is, the connection between different skeleton points. Therefore, the present invention obtained skeleton data of human body posture with different weights by introducing a Bahdanau attention neural network, and then a directed graph model of human body posture is established via graph convolution neural network to extract accurate skeleton features.

S21, Skeleton Features Weight Network a neural network model incorporating attention mechanism is established to obtain the weight information of different human skeleton points. For the input three-dimensional posture data, a basic initialization weight distribution is performed, and setting an attention weight by normalizing an activation function, the specific formula is as follows:

$$\alpha_{ij} = \frac{\exp(\text{score})}{\Sigma_{j=1}^{n}\exp(\text{score})};$$

where $$\sum\nolimits_{j=1}^{n}\alpha_{ij} = 1,$$

a value score is a correlation function between input and output, which is defined as follows:

$$\text{score} = v * \tanh\left(r_j \odot \sum\nolimits_{i=1}^{n} x_i\right);$$

where v denotes an offset vector, which is a parameter that can be trained in the model, $x_i$ denotes an input matrix vector, $r_j$ is a feature probability. The feature weights of different skeleton points are shown below:

$$w_i i = v * \alpha_{ij}$$

S22, Graph Convolution Network the human skeleton topology is established by comprehensively considering the position of the skeleton key points and the angle between the limbs, when the two groups of human behavior information are similar, their target values after dimensionality reduction are also similar, therefore, the human skeleton structure is represented by a graph structure, and the feature expression form after graph convolution operation can be obtained. Here, each group of human body posture directed graphs is composed of its unit matrix and an adjacency matrix used to express the connection relationship of body limbs. A convolution layer operation is obtained via a convolution operation of a signal x and a signal g, where the signal x denotes an input graph information, and the signal g denotes a convolution kernel, the convolution operation of the two is obtained via Fourier transform, where a F function denotes the Fourier transform, which is used to map the signal to the Fourier domain, as shown below:

$$x * g = F^{-1}(F(x) \odot F(g));$$

the Fourier transform function F(x) can be written as $U^T x$, where U denotes the Laplacian matrix corresponding to the topological graph, the matrix after feature transformation, namely the feature vector of the Laplacian matrix constitutes each row of the matrix U. Then $L = U\Lambda U^T$ is obtained. The graph convolution operation formula is as follows, where gϕ denotes the convolution operation, which can be approximately calculated by Chebyshev polynomial:

$$x * g = U(U^T x \odot U^T g) = U_{g\phi} U^T x;$$

finally, it is assumed that the features extracted from the first layer of the graph convolution neural network is $f^{l+1} \in \mathbb{R}^{K*C}$ where $\mathbb{R}^{K*C}$ denotes that a size of the feature map is K*C and its training parameter is set to $W \in \mathbb{R}^{C*C}$, by calculating it with the correlation matrix $Z \in \mathbb{R}^{K*K}$ of the graph Laplacian matrix, the final convolution can be obtained as follows, where c denotes the activation function, Leaky ReLu (Leaky Rectified Linear Unit) is used as the activation function in this model, and the correlation matrix Z is set as a trainable parameter to prevent over-fitting during model training.

$$f^{l+1} = \sigma(ZF^l W).$$

Figure 14:
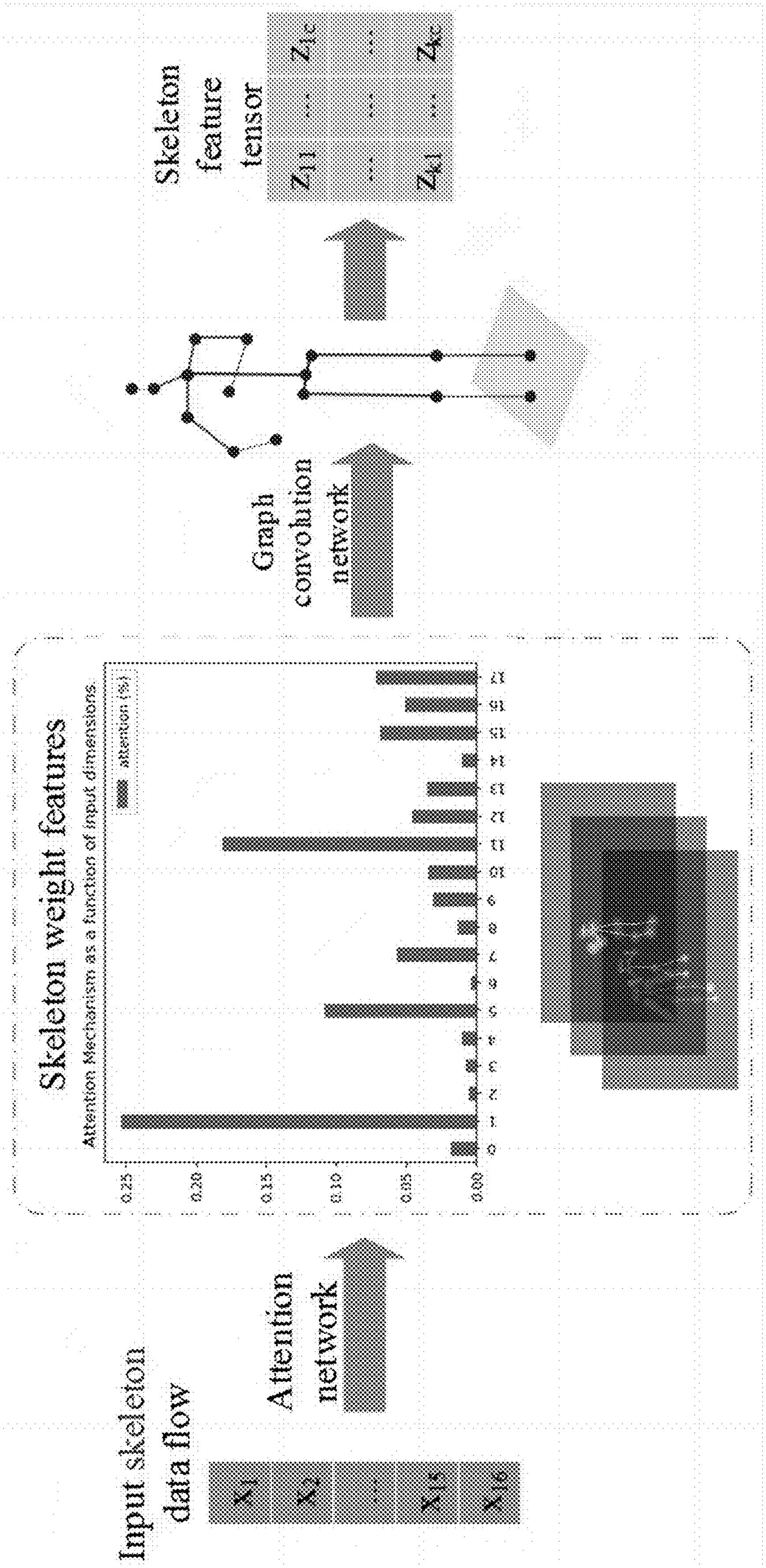
FIG. 14 is a flow chart of a graph convolution architecture of the human body posture of the present invention.

As shown in FIG. 14, is the flow chart of the convolution skeleton features extraction of the human body posture map.

S3, Extraction of Image Features while obtaining the three-dimensional skeleton data, the two-dimensional skeleton data is retained to obtain the human body region in the image and extract the effective image features. Then the skeleton expansion coefficient λ is introduced as a training parameter and trained by the neural network. The original expression of the rectangular region of the segmented human body can be set to $(X_{min}, Y_{min})$, $(X_{max}, Y_{max}) = (\min(I_x), \min(I_y))$, $(\max(I_x), \max(I_y))$ where $(X_{min} - Y_{min})$, $(X_{max}, Y_{max})$ denote the lower left corner (X, Y) coordinates and the upper right corner (X, Y) coordinates of the segmented region, respectively, and $I_x$ and $I_y$ denote the (X, Y) coordinates of the input skeleton data, respectively. Then the resulting image segmentation rectangular region is $(X_l, Y_l)$, $(X_r, Y_r)$ $(X_{min} - \lambda, Y_{min} - \lambda)$, $(X_{max} + \lambda, Y_{max} + \lambda)$, where the default initial value of λ is 1, denoting the expansion of 1 pixel.

The image features extraction of the present invention obtains the image features tensor through the Vision Transformer architecture, which is composed of an encoder and a decoder, each encoder and decoder is composed of a multi-head attention (MSA) and a fully connected network, and is connected by residuals between each attention layer and the neural network layer. Firstly, the segmented rectangular region of the human body is input into the Vision Transformer as a structural block, and then the block is converted into a feature vector with dimension D by linear transformation and combined with its position coding vector. Then the input image is divided into different image blocks, constructed into an image sequence $z_0$, and input into the encoder. Here, each encoder is composed of two sub-modules: a multi-head attention module and a feedforward neural network module, wherein, a LN (LayerNorm) normalization layer is added in front of each neural network module, and a Gelu layer is added in the middle layer, as shown below:

$$z'_l = MSA(\mathrm{LN}(z_{l-1})) + z_{l-1},\ l = 1, \ldots L;$$

$$z_l = MSA(\mathrm{LN}(z'_l)) + z'_l,\ l = 1, \ldots L.$$

For the input image sequence, each element is multiplied by a key vector K, value vector V and query vector Q that generated during the training process, and then the dot product of the current element Q value and other element K value is calculated as the score value, and normalized to ensure the stability of the gradient echo, finally, the multi-head attention feature weight is obtained by SoftMax.

Figure 15:
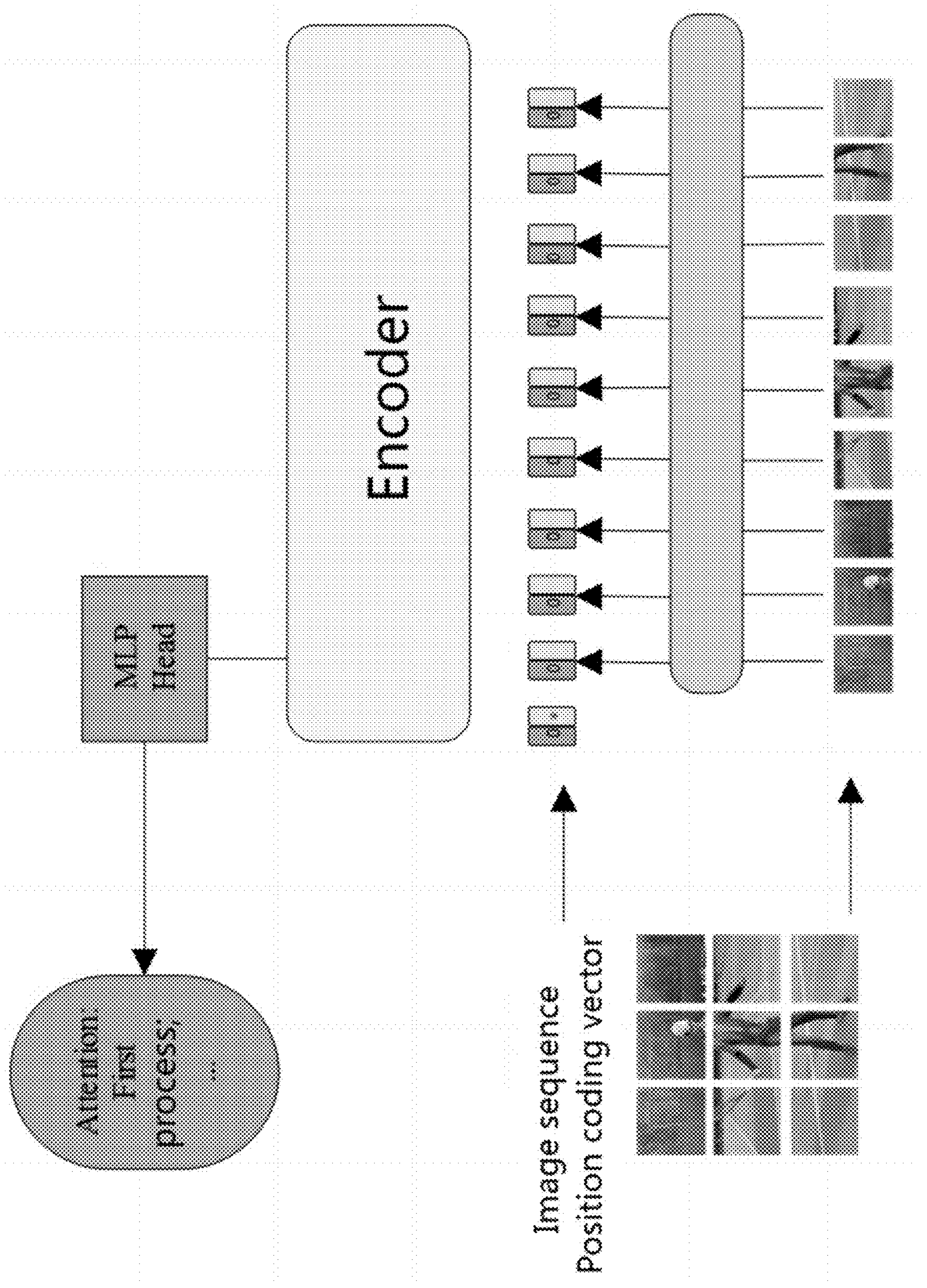
FIG. 15 is an image features extraction network of an interactive behavior understanding method for posture reconstruction of the present invention.

As shown in FIG. 15, it is the Vision Transformer image features extraction network architecture, in which each image block is flattened by a linear projection matrix, and then the position coding vector is added as the common input of the network to ensure that the original feature still retains the position information of the feature during the formation of the image sequence.

S4, Fusion and Reconstruction of Features

Figure 16:
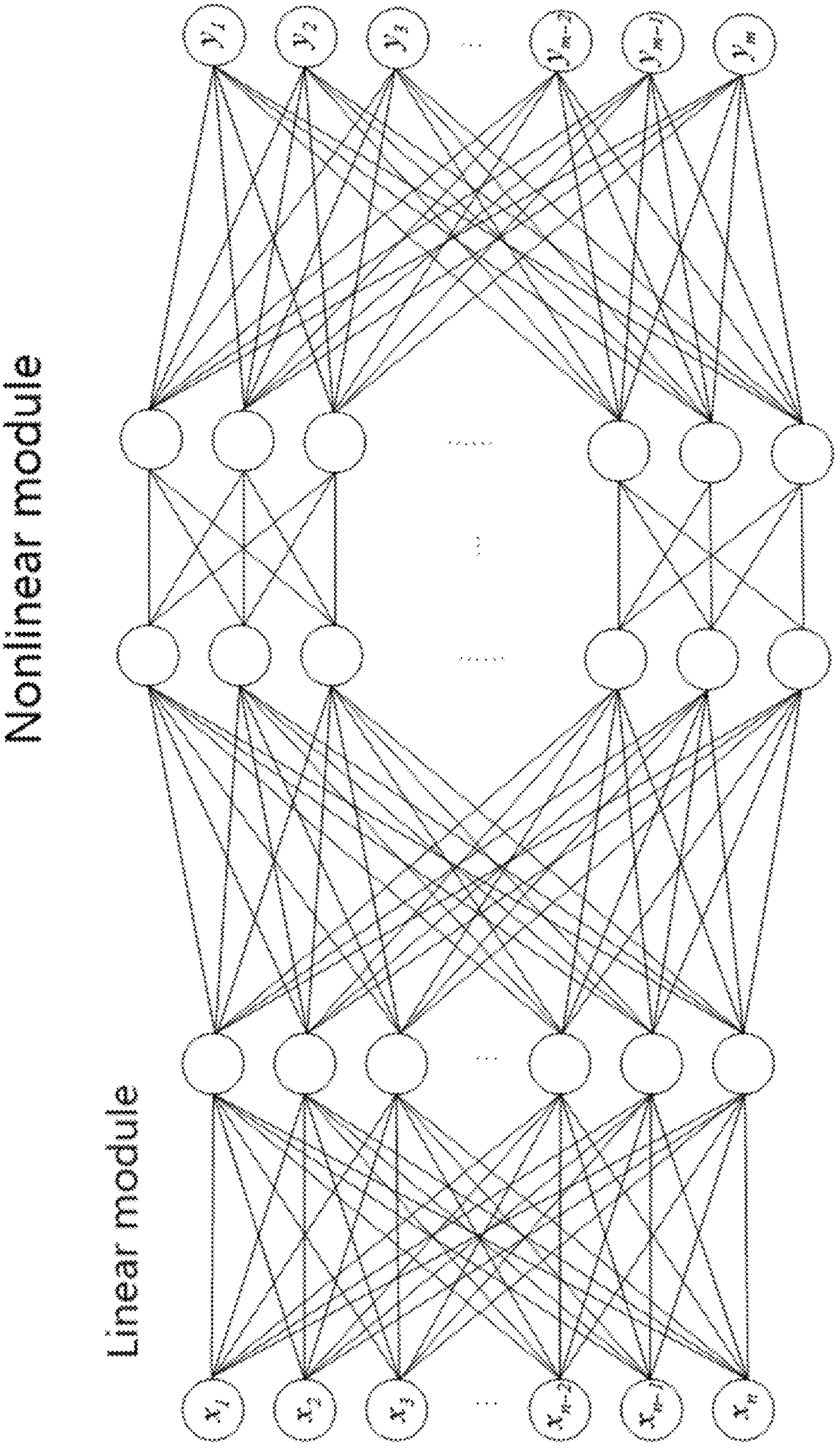
FIG. 16 is an image fusion Wide & Deep network structure of the present invention.

After the skeleton features and image features of the same dimension are obtained, the two features are fused and input into the classification network. The present invention uses a Wide&Deep neural network for the reconstruction and fusion of features, and finally, the probability of behavior category is obtained through the SoftMax classifier. The network structure establishes a linear module and a nonlinear module respectively, wherein the linear module is mainly used to fit the direct relationship between input and output, so that the model has good memory ability. The nonlinear module retains the excellent fitting ability in the original neural network, which further improves the generalization ability of the model and directly achieves a certain balance between nonlinear features and linear features. As shown in FIG. 16, the feature fusion Wide&Deep network structure diagram.

The Wide module consists of a linear module $y=w^Tx+b$, where x denotes an input feature vector in the form of $x=[x_1,x_2 \ldots, x_n]$, $w=[w_1,w_2, \ldots, w_n]$ is a model training parameter, and b denotes a model bias term; the input fusion features comprise original input feature vectors and transformed feature vectors, where the transformed features are obtained by cross product transformation, as shown below, where $c_{ki}$ denotes a Boolean variable, that is, if the i-th is a part of the k-th transformation $\varphi_k$, then it is 1, otherwise it is 0:

$$\phi_k(x) = \prod_{i=1}^{n} x_i^{c_{ki}},\ c_{ki} \in \{0, 1\};$$

the Deep module is mainly composed of nonlinear neural networks, its main purpose is to convert the input features into low-dimensional embedded vectors, and reduce the loss through model training to optimize the results. Wherein the specific meaning of forward propagation is as follows, where a(i+1) denotes an output of a l+1 layer, and a denotes an activation function:

$$a_{(l+1)} = \sigma(W_{(l)}a_{(l)} + b_{(l)});$$

finally, the logarithm of the output values of the Wide module and the Deep module is combined, and the predicted value is weighted, then the loss function is used to calculate the loss and optimize the model parameters, and the gradient of the two parts is simultaneously back-propagation to complete the gradient echo through the small batch gradient descent optimization algorithm. As shown below is the final output probability expression of the model, where y denotes a prediction category label, a denotes the activation function, φ(x) denotes a cross product transformation, x denotes the input feature vector.

$$P(y|x) = \sigma\left(W_{wide}^T[x, \phi(x)] + W_{deep}^T a_1 + b\right).$$

Figure 17:
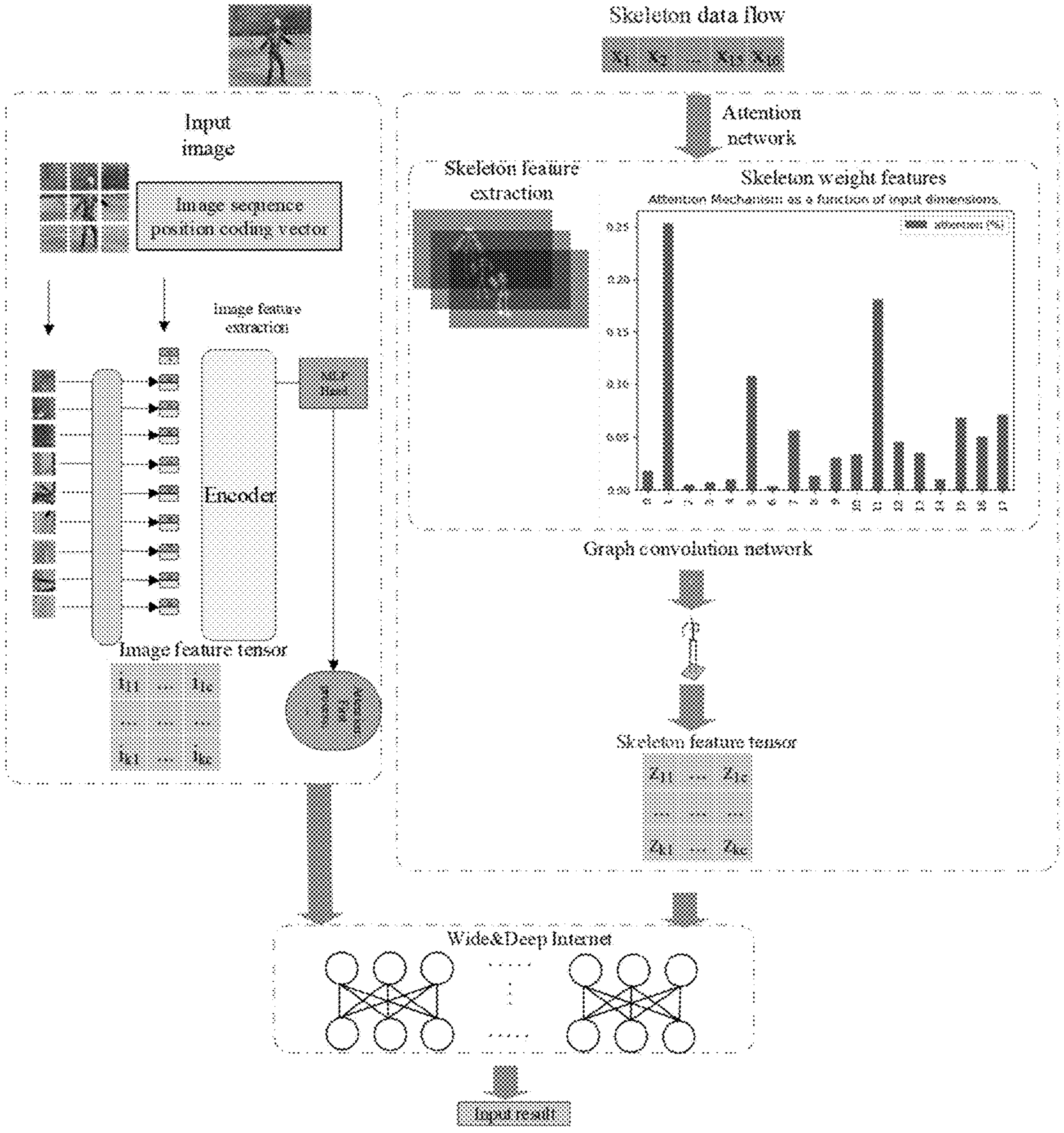
FIG. 17 is an overall network structure of a fusion of a skeleton feature and an image feature of the invention.

As shown in FIG. 17, it is the overall network structure diagram of the fusion of the skeleton features and image features.

S5, Experimental Evaluation and Validation the experiment in this part uses a pure skeleton human behavior understanding algorithm and a pure image target detection behavior understanding algorithm to compare with the effect of this algorithm. Wherein the skeleton behavior understanding algorithm adopts the time series model LSTM, Transformer sequence model and DNN (Dynamic Neural Network) neural network algorithm respectively. The behavior understanding algorithm based on target detection uses the single-stage target detection algorithm YOLOv5 and the double-stage target detection algorithm Fast R-CNN algorithm to compare with the algorithm in this paper.

S51, Model Training Environment and Parameters the experimental model training environment is established in the Windows10® environment, using CUDA 10.1® to establish the GPU environment for training, and Python 3.6.5® as a compiler. The specific training environment of the algorithm is shown in Table 8.

TABLE 8

Training environment of behavior understanding algorithm in this paper

| Category | Environmental parameter |
|---|---|
| Operating system | Windows 10 ® |
| Run memory | 16G |
| Script language | Python 3.6.5 ® |
| Deep learning framework | Pytorch ® |
| CPU model | AMD Ryzen ™ 7 4800H with Radeon ™ Graphics |
| GPU model | NVIDIA Geforce ® GTX 3090 |

The specific model parameters for the setup as shown in Table 9:

TABLE 9

Model training parameters of behavior understanding algorithm in this paper

| Parameter name | Meaning | Parameter value |
|---|---|---|
| Optimizer | Optimizer | Adam |
| Init_lr | Initial learning rate | 0.001 |
| Epoch | Training times of all data sets | 1000 |
| BatchSize | Number of training batch samples | 128 |

S52, Experimental Evaluation

The experiment of the present invention evaluates the performance of the model through the ACC (Accuracy)

index. The model speed is evaluated by the FPS value of the number of pictures that the model can recognize per second in the model inference stage. Wherein, the skeleton classification comparative experiment data set is composed of pure skeleton data, the corresponding category labels are labeled for each group of skeleton data, and then the LSTM, Transformer and DNN algorithms are used for experimental evaluation. In the image target detection part, LabelMe is used to calibrate different behaviors in the image data to form a Json file containing image region and label information, and then YOLOv5 and other target detections are used for experimental evaluation. Data set evaluation is divided into individual behavior evaluation and interactive behavior evaluation, wherein, the individual behavior comprises daily behaviors such as walking and standing. 'human-object' interactive behaviors comprise playing tennis and badminton. 'human-human' interactive behaviors comprise fighting and hugging.

As shown in Table 10, it is the experimental performance of the behavior understanding algorithm in the local data set.

TABLE 10

Comparison of accuracy of local data sets of behavior understanding algorithm

| Methods of use | Individual behavior | Interactive behavior | All behaviors | FPS |
|---|---|---|---|---|
| Skeleton features + LSTM | 0.8332 | 0.6993 | 0.7663 | 34 |
| Skeleton features + Transformer | 0.8624 | 0.7433 | 0.8029 | 33 |
| Skeleton features + DNN | 0.8533 | 0.7235 | 0.7884 | 34 |
| Image features + Fast R-CNN | 0.8906 | 0.7988 | 0.8447 | 25 |
| Image features + YOLOv5 | 0.8956 | 0.7863 | 0.8410 | 29 |
| Algorithm of this paper | 0.9223 | 0.8892 | 0.9058 | 32 |

As shown in Table 11, is the comparison of the experimental effects of the behavior understanding algorithm applied to the public data sets from different perspectives.

TABLE 11

Accuracy comparison of NTU-RGB + D data set

| Methods of use | X-View | X-Sub |
|---|---|---|
| Skeleton features + LSTM | 81.3% | 66.3% |
| Skeleton features + Transformer | 84.7% | 71.5% |
| Skeleton features + DNN | 84.5% | 70.8% |
| Image features + Fast R-CNN | 87.3% | 75.4% |
| Image features + YOLOv5 | 87.9% | 77.6% |
| Algorithm of this paper | 90.4% | 82.6% |

From the analysis of the experimental results, it can be seen that the behavior understanding algorithm that simply relies on skeleton information has higher speed, and has higher recognition accuracy in individual behavior understanding, but in interactive behavior understanding, the algorithm performs poorly. The reason is that it ignores the original image information, that is, for the interaction behavior, which relies on the effective image information, a single skeleton behavior understanding algorithm will lead to the loss of information extraction.

Similarly, the target detection algorithm that purely relies on image information is used for human behavior understanding, due to the complex structure of the algorithm model, the running speed of the model is slow and the real-time performance is poor. However, the accuracy of model recognition is higher than that of single skeleton behavior.

After comparison, the behavior understanding algorithm of the fusion of image features and skeleton features comprehensively utilizes the effective features of the image, which can better remove redundant noise and perform best in recognition accuracy. Meanwhile, due to the improvement of the model lightweight, the running speed of the model has also been improved to a certain extent, which has more application value.

Figure 18:
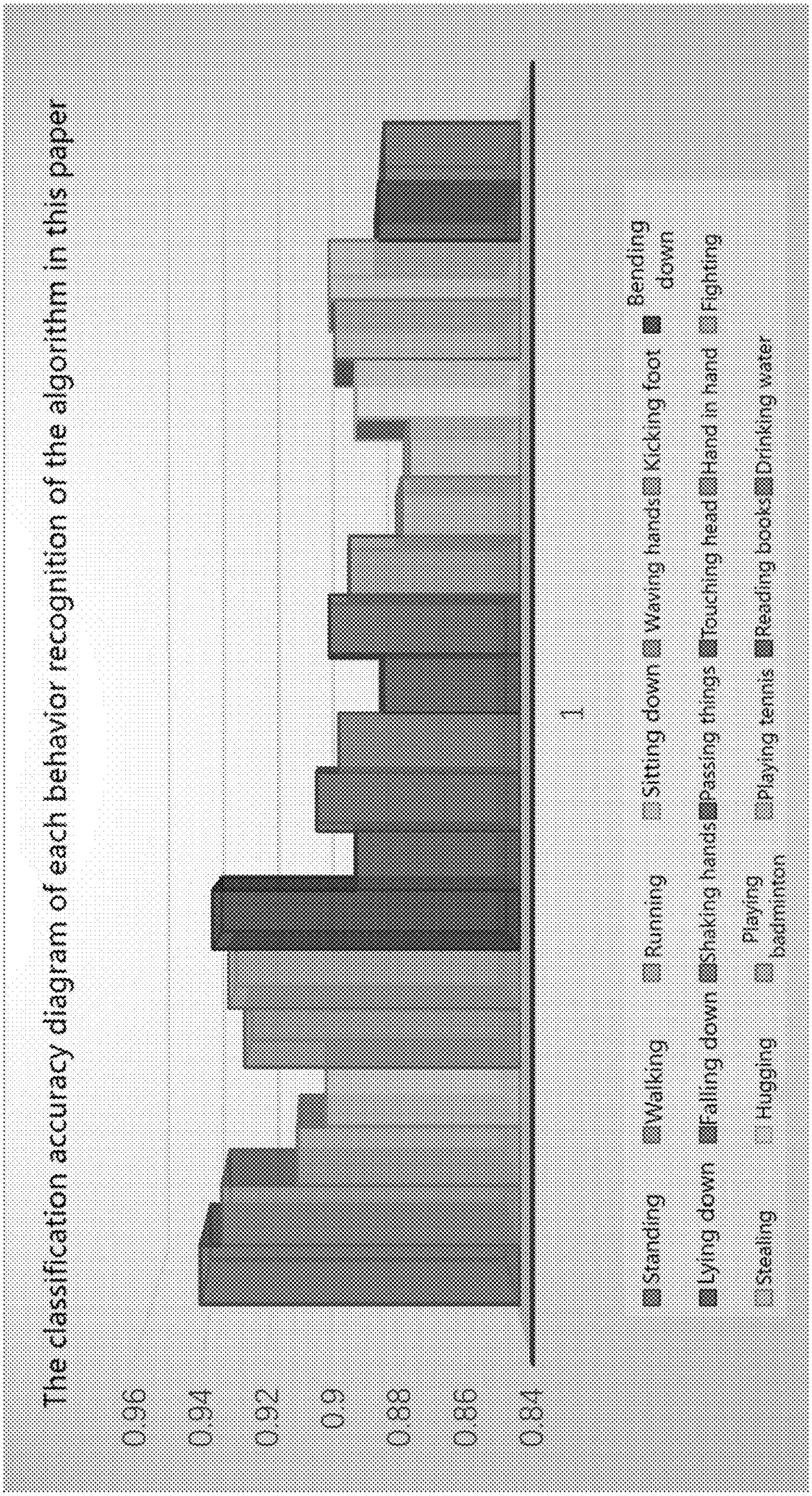
FIG. 18 is a recognition accuracy of each behavior by the behavior understanding algorithm of the present invention.

As shown in FIG. 18, it is the recognition accuracy graph of the algorithm for each behavior.

Figure 19:
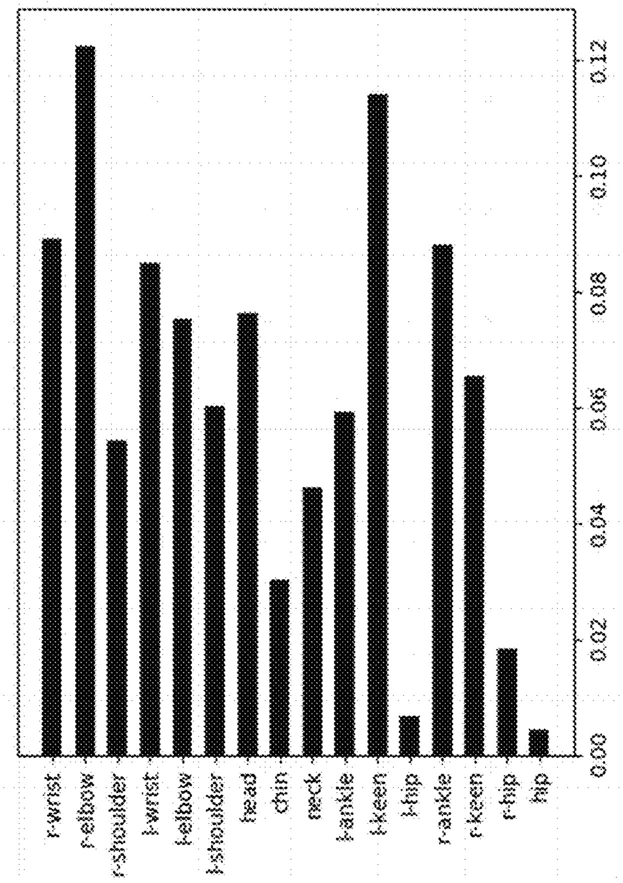
FIG. 19 is an attention network skeleton features weight distribution of the present invention; wherein FIG. 19(*a*) is a skeleton weight distribution of a global action.
Figure 19:
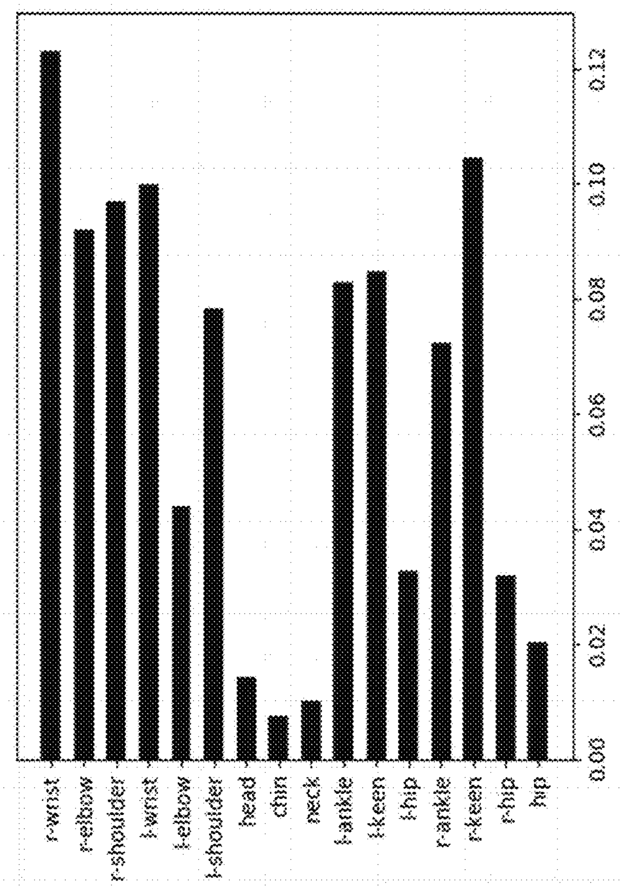
Figure 20:
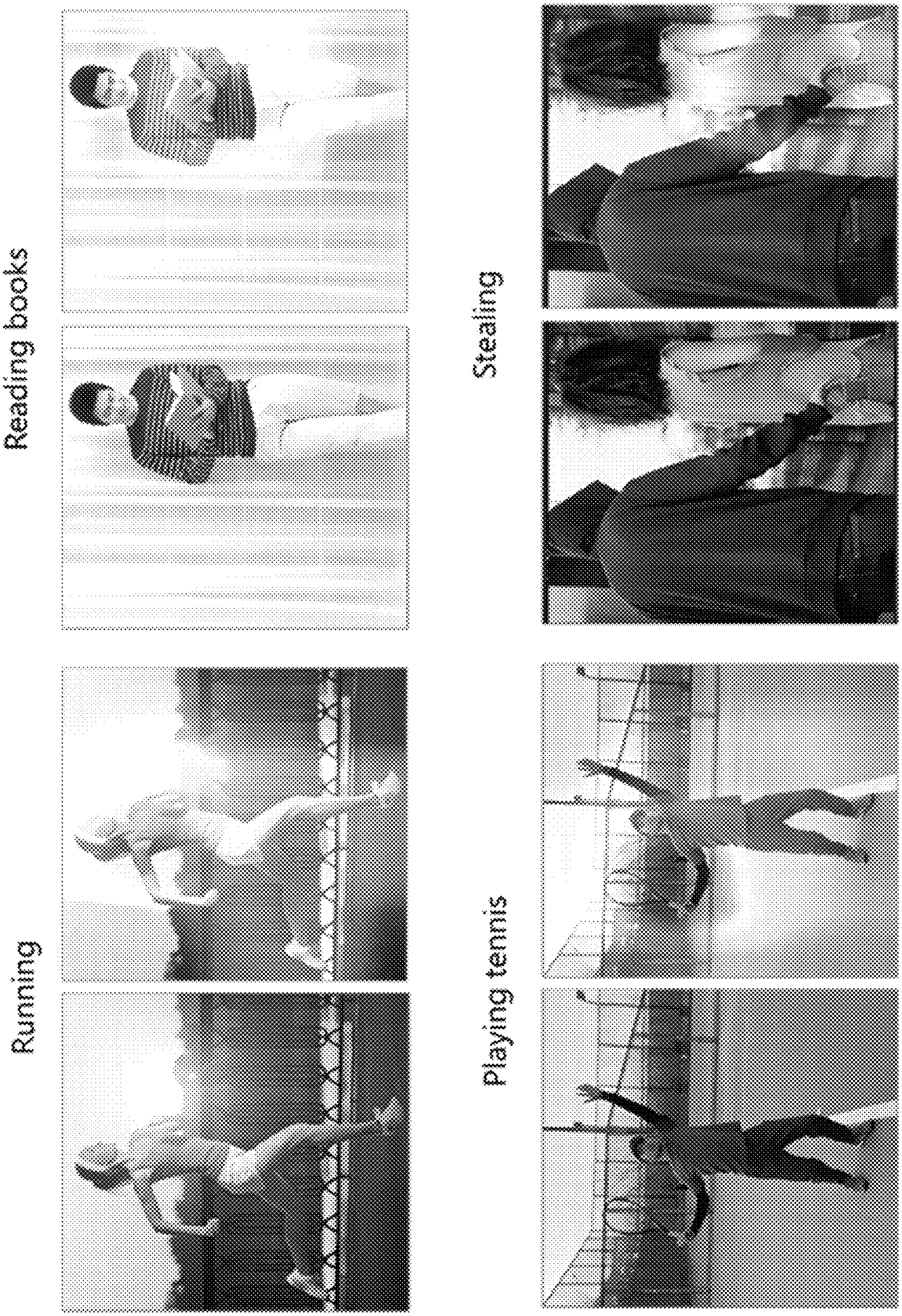
FIG. 20 is a feature activation diagram of the Vision Transformer attention image of the present invention.

As shown in FIG. 19, is the attention network skeleton features weight distribution map. Wherein FIG. 20(*a*) is a weight distribution of the global data set for skeleton features, the weight of the overall movement skeleton features is from 0 to 15 [0.0045845401,0.0188367274, 0.0657692422,0.0883763475,0.0069323099,0.11422323 53,0.0594012654,0.0465061087,0.0306623435,0.0765381, 0.0605252366,0.075697909 9,0.0852956267, 0.0544496286,0.1227602038,0.0894338934]. FIG. 20(*b*) is a weight distribution of skeleton features of tennis action. It can be seen that when it comes to tennis movements, its skeleton features are mainly focused on joint positions such as hands and waist, and its weight distribution is relatively uniform for global movements.

As shown in FIG. 20, is a feature activation diagram of the Vision Transformer attention image for each action.

Figure 21:
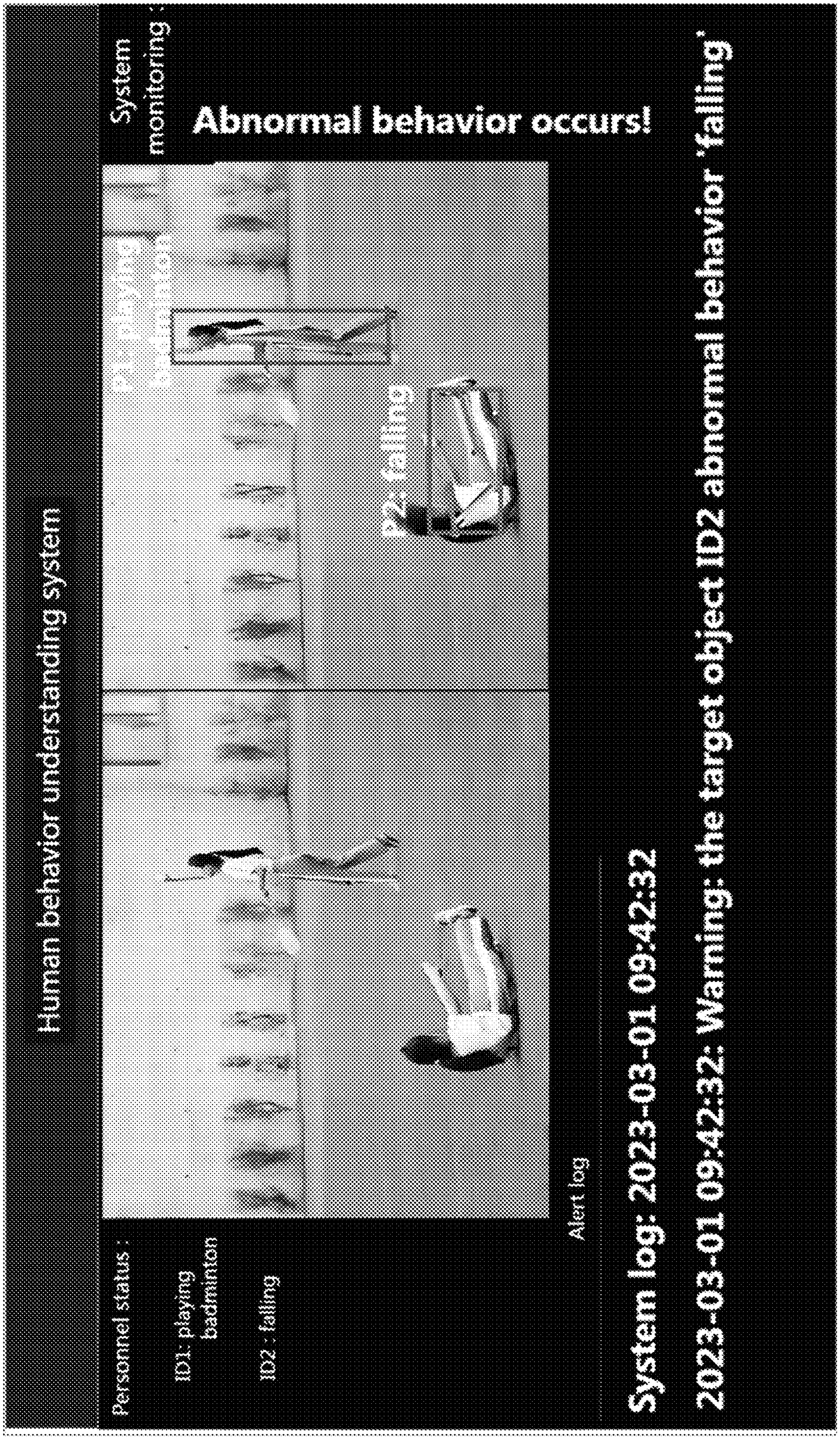
FIG. 21 is a model effect display system of an interactive behavior understanding method for posture reconstruction of the present invention.

As shown in FIG. 21, is a model effect display system.

Therefore, the present invention adopts the above-mentioned interactive behavior understanding method for posture reconstruction based on features of skeleton and image, fuses skeleton features and image features, and reconstructs features, it not only retains the purity of skeleton features for human behavior information extraction, but also uses image features to retain effective image information such as environment, so as to further complement the model feature information. Specifically, the skeleton features extracted by the graph convolution network make good use of the joint directed graph structure of the human skeleton, increase the relevance of the input skeleton point information, and obtain the accurate skeleton features. Then, the image is divided into image block sequences through the Vision Transformer network, and combined with the multi-head attention mechanism, effective image features can be extracted quickly and accurately. In the experimental part, the algorithm in this paper is compared with the simple skeleton features recognition algorithms LSTM, Transformer, DNN and image target detection behavior classification algorithms Fast R-CNN and YOLOv5, finally, the accuracy of the algorithm in this paper is improved by 7.2% and the speed is improved by 28% compared with the optimal algorithm, which verifies the efficiency and accuracy of the algorithm in this paper, indicating that the algorithm in this paper can be better applied to human behavior understanding.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. An interactive behavior understanding method for posture reconstruction based on features of skeleton and image, specific steps are as follows:

construction and preprocessing of a data set;

construction of the data set: extraction of skeleton features, firstly, extracting a two-dimensional skeleton information of a human via an improved OpenPose® algorithm, and then generating a complete three-dimensional human skeleton data as a skeleton data via an occlusion prediction network and a three-dimensional human body posture estimation; wherein, steps of a three-dimensional human body posture estimation algorithm in a case of occlusion are as follows:

preprocessing of the data set: the data set consists of two parts, one part of the two parts is based on a generative antagonistic interpolation network to realize an occlusion prediction of three-dimensional human body posture, and an experiment needs to use a Common Objects in Context (COCO) human body posture data set, an other part of the two parts is to map a two-dimensional human body posture data to a three-dimensional human body posture data, a data set used in the experiment is a public data set Human3.6M data set;

a generative antagonistic interpolation network: predicting missing human skeleton key points by establishing the generative antagonistic interpolation network to obtain complete human skeleton key point information;

posture occlusion prediction network architecture: when training a discriminator, it is necessary to first fix a generator, by introducing missing data predicted by the generator and an original real data into the discriminator, calculating an error and performing a back-propagation to update discriminator parameters; when training the generator, a network of the discriminator needs to be fixed, and inputting a predicted value output by the generator into the discriminator as a negative sample, updating parameters of the generator by back propagation according to the error of the discriminator;

three-dimensional human body posture estimation: learning a mapping relationship of the three-dimensional human body posture data based on a nonlinear module and an Orthogonal Weights Modification (OWM) module network;

experimental analysis and validation: an experiment is divided into two parts: an occlusion prediction experiment and a three-dimensional human body posture estimation experiment, wherein, the occlusion prediction experiment is evaluated by calculating a root mean square error of a real data and a predicted missing data, and the three-dimensional human body posture estimation experiment is evaluated by calculating an error between a predicted three-dimensional coordinates and a real coordinate;

extraction of skeleton features: firstly, introducing a Bahdanau attention neural network to obtain skeleton data of human body posture with different weights; then establishing a directed graph model of the human body posture via a graph convolution neural network to extract accurate skeleton features;

wherein, steps of extraction of skeleton features are as follows:

skeleton features weight network: for the three-dimensional human body posture data, performing a basic initialization weight distribution, and setting an attention weight by normalizing an activation function, wherein a specific formula is as follows:

$$\alpha_{ij} = \frac{\exp(\text{score})}{\sum_{j=1}^{n} \exp(\text{score})};$$

wherein $$\sum_{j=1}^{n} \alpha_{ij} = 1,$$

a value score is a correlation function between input and output, which is defined as follows:

$$\text{score} = v * \tanh\left(r_j \odot \sum_{i=1}^{n} x_i\right);$$

wherein v denotes an offset vector, which is a parameter that can be trained in the directed graph model, $x_i$ denotes an input matrix vector, $r_j$ is a feature probability, and wherein feature weights of different skeleton points are shown below:

$$w_{ij} = v * \alpha_{ij};$$

graph convolution network: obtaining a convolution layer operation via a convolution operation of a signal x and a signal g, wherein the signal x denotes an input graph information, and the signal g denotes a convolution kernel, the convolution layer operation of the signal x and the signal g is obtained via Fourier transform, where an F function denotes the Fourier transform, which is used to map a signal to a Fourier domain, as shown below:

$$x * g = F^{-1}(F(x) \odot F(g));$$

extraction of image features: firstly, while acquiring three-dimensional skeleton data, reserving two-dimensional skeleton data to acquire human regions in images and extracting effective image features; then, introducing a skeleton expansion coefficient λ as a trainable parameter, and training the trainable parameter via a neural network;

in image features extraction, each encoder is composed of two sub-modules: a multi-head attention module and a feedforward neural network module, as shown below:

$$z'_l = MSA(\text{LN}(z_{l-1})) + z_{l-1},\ l = 1, \ldots L;$$

$$z_l = MSA(\text{LN}(z'_l)) + z'_l,\ l = 1, \ldots L;$$

fusion and reconstruction of features: after acquiring skeleton features and image features of a same dimension, fusing and inputting the skeleton features and the image features together into a classification network;

in fusion and reconstruction of features, a Wide module consists of a linear module $y=w^T x+b$, wherein x denotes an input feature vector in a form of $x=[x_1, x_2 \ldots, x_n]$, $w=[w_1, w_2, \ldots, w_n]$ is a model training parameter, and b denotes a model bias term; input fusion features comprise original input feature vectors and transformed feature vectors, wherein the transformed feature vectors are obtained by cross product transformation, as shown below, wherein $c_{ki}$ denotes a Boolean variable, that is, if an i-th is a part of a k-th transformation $\varphi_k$, then it is 1, otherwise it is 0:

$$\phi_k(x) = \prod_{i=1}^{n} x_i^{c_{ki}}, c_{ki} \in \{0, 1\};$$

a specific meaning of forward propagation is as follows, wherein $a_{(l+1)}$ denotes an output of an l+1 layer, and a denotes an activation function:

$$a_{(l+1)} = \sigma(W_{(l)}a_{(l)} + b_{(l)});$$

a loss function is used to calculate a loss, model parameters are optimized, and an algorithm is optimized via a small batch gradient descent, wherein y denotes a prediction category label, $\sigma$ denotes the activation function, $\phi(x)$ denotes a cross product transformation, x denotes the input feature vector, a final output probability expression of a model is as follows:

$$P(y|x) = \sigma\left(W_{wide}^T[x, \phi(x)] + W_{deep}^T a_1 + b\right);$$

experimental evaluation and validation: a model training environment is established in a Windows10® environment, CLTDA 10.1® is used to establish a GPU environment for training, and Python 3.6.5® is used as a compiler.

* * * * *